(12) United States Patent
Nishimori et al.

(10) Patent No.: US 9,279,566 B2
(45) Date of Patent: Mar. 8, 2016

(54) LIGHT DEFLECTOR, LIGHT SOURCE DEVICE, IMAGE PROJECTING DEVICE, AND DISPLAY DEVICE

(71) Applicants: Takehiro Nishimori, Kanagawa (JP); Kazuhiro Fujita, Tokyo (JP); Toshiharu Murai, Kanagawa (JP); Ikuo Maeda, Kanagawa (JP); Tatsuya Takahashi, Tokyo (JP)

(72) Inventors: Takehiro Nishimori, Kanagawa (JP); Kazuhiro Fujita, Tokyo (JP); Toshiharu Murai, Kanagawa (JP); Ikuo Maeda, Kanagawa (JP); Tatsuya Takahashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 198 days.

(21) Appl. No.: 13/959,981

(22) Filed: Aug. 6, 2013

(65) Prior Publication Data
US 2014/0036241 A1 Feb. 6, 2014

(30) Foreign Application Priority Data

Aug. 6, 2012 (JP) .................................. 2012-174429
May 22, 2013 (JP) .................................. 2013-108177

(51) Int. Cl.
*G03B 21/20* (2006.01)
*H04N 9/31* (2006.01)
*G02B 19/00* (2006.01)
(Continued)

(52) U.S. Cl.
CPC . *F21V 13/04* (2013.01); *F21V 5/04* (2013.01); *F21V 7/0008* (2013.01); *F21V 7/0033* (2013.01); *G02B 19/0014* (2013.01); *G02B 19/0061* (2013.01); *G03B 21/208* (2013.01); *F21V 29/02* (2013.01); *G02B 19/0066* (2013.01); *G03B 21/2013* (2013.01); *G03B 21/2066* (2013.01); *H04N 9/3138* (2013.01); *H04N 9/3164* (2013.01)

(58) Field of Classification Search
CPC .......... G03B 21/2033; G03B 21/2066; G03B 21/2013; H04N 9/3138; H04N 9/3164; G02B 19/0061; G02B 19/0066; G02B 19/0047; F21V 5/007; F21V 13/045; F21V 13/04
USPC ................... 353/94; 362/326, 335, 244, 236
See application file for complete search history.

(56) References Cited

U.S. PATENT DOCUMENTS 5,674,001 A 10/1997 Weigert
7,303,290 B2 * 12/2007 Wittenberg et al. .......... 353/101
(Continued)

FOREIGN PATENT DOCUMENTS

CN 1898968 1/2007
CN 201836714 U 5/2011
(Continued)

OTHER PUBLICATIONS

Chinese Office Action dated Mar. 23, 2015.
(Continued)

*Primary Examiner* — William C Dowling
*Assistant Examiner* — Ryan Howard
(74) *Attorney, Agent, or Firm* — IPUSA, PLLC

(57) ABSTRACT

Disclosed is a light deflector including a light-emitting element configured to emit a light beam with a substantially elliptical cross-sectional shape, and a lens configured to condense light emitted from the light-emitting element, wherein an optical axis of the light-emitting element and an optical axis of the lens are decentered and a longitudinal axis of the light beam with the substantially elliptical cross-sectional shape is arranged in a direction orthogonal to a direction of decentering on the lens.

11 Claims, 14 Drawing Sheets

(51) Int. Cl.
*F21V 13/04* (2006.01)
*F21V 5/04* (2006.01)
*F21V 7/00* (2006.01)
*F21V 29/02* (2006.01)

(56) References Cited

U.S. PATENT DOCUMENTS

| | | | |
|---|---|---|---|
| 7,390,097 B2* | 6/2008 | Magarill | 353/94 |
| 8,167,440 B2 | 5/2012 | Sato et al. | |
| 2005/0024602 A1* | 2/2005 | Shimaoka et al. | 353/94 |
| 2005/0134811 A1 | 6/2005 | Magarill et al. | |
| 2006/0002114 A1 | 1/2006 | Sun | |
| 2007/0007439 A1 | 1/2007 | Nuebling | |

| | | | |
|---|---|---|---|
| 2012/0249972 A1* | 10/2012 | Kurosaki | G03B 21/2013 353/31 |

FOREIGN PATENT DOCUMENTS

| | | |
|---|---|---|
| JP | 2004-013107 | 1/2004 |
| JP | 2004-221042 | 8/2004 |
| JP | 2006-163281 | 6/2006 |
| JP | 2008-090016 | 4/2008 |
| JP | 2011-013317 | 1/2011 |
| JP | 2012-032691 | 2/2012 |
| WO | WO 2006-027621 | 3/2006 |

OTHER PUBLICATIONS

Extended European search report dated Nov. 4, 2013.

* cited by examiner

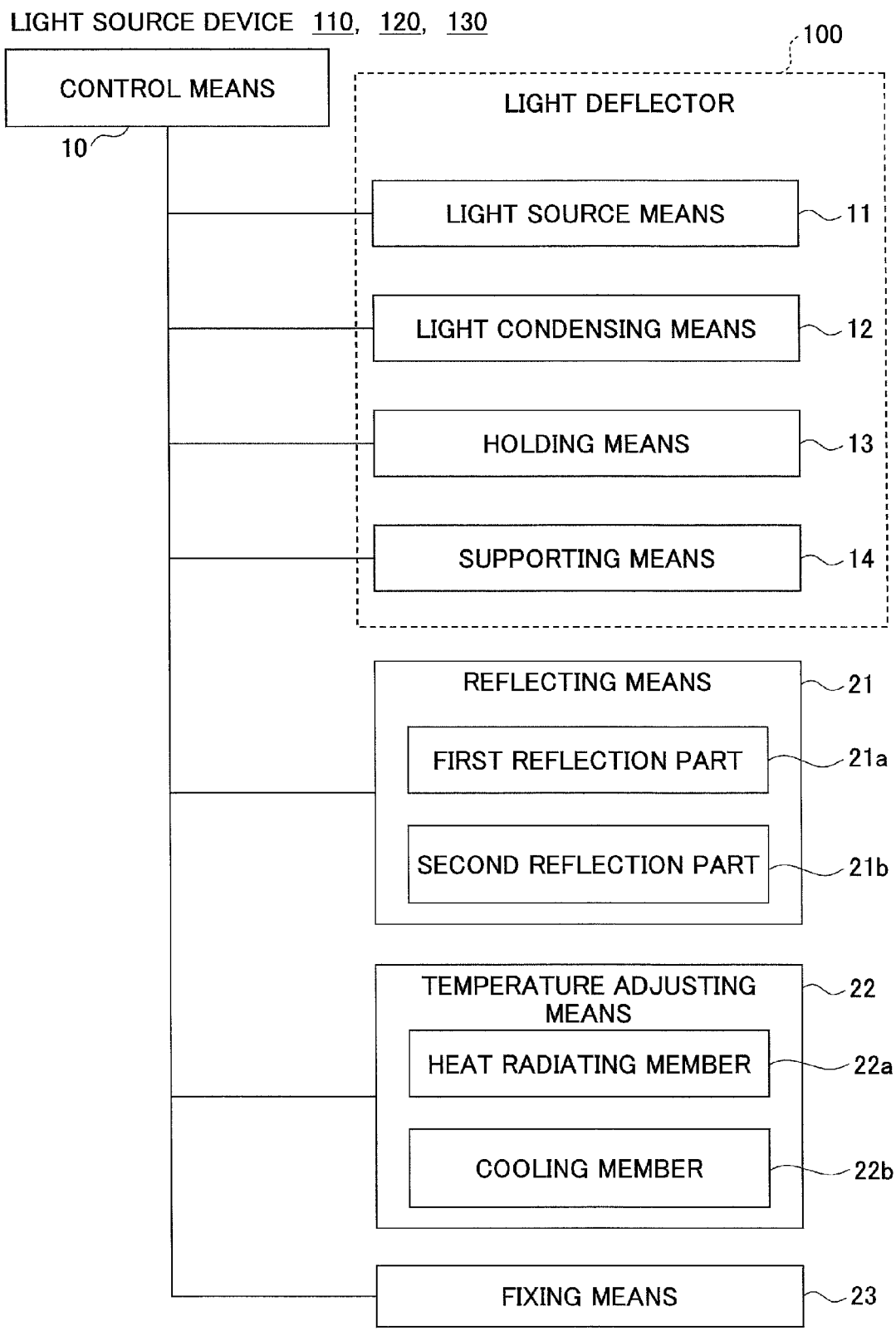

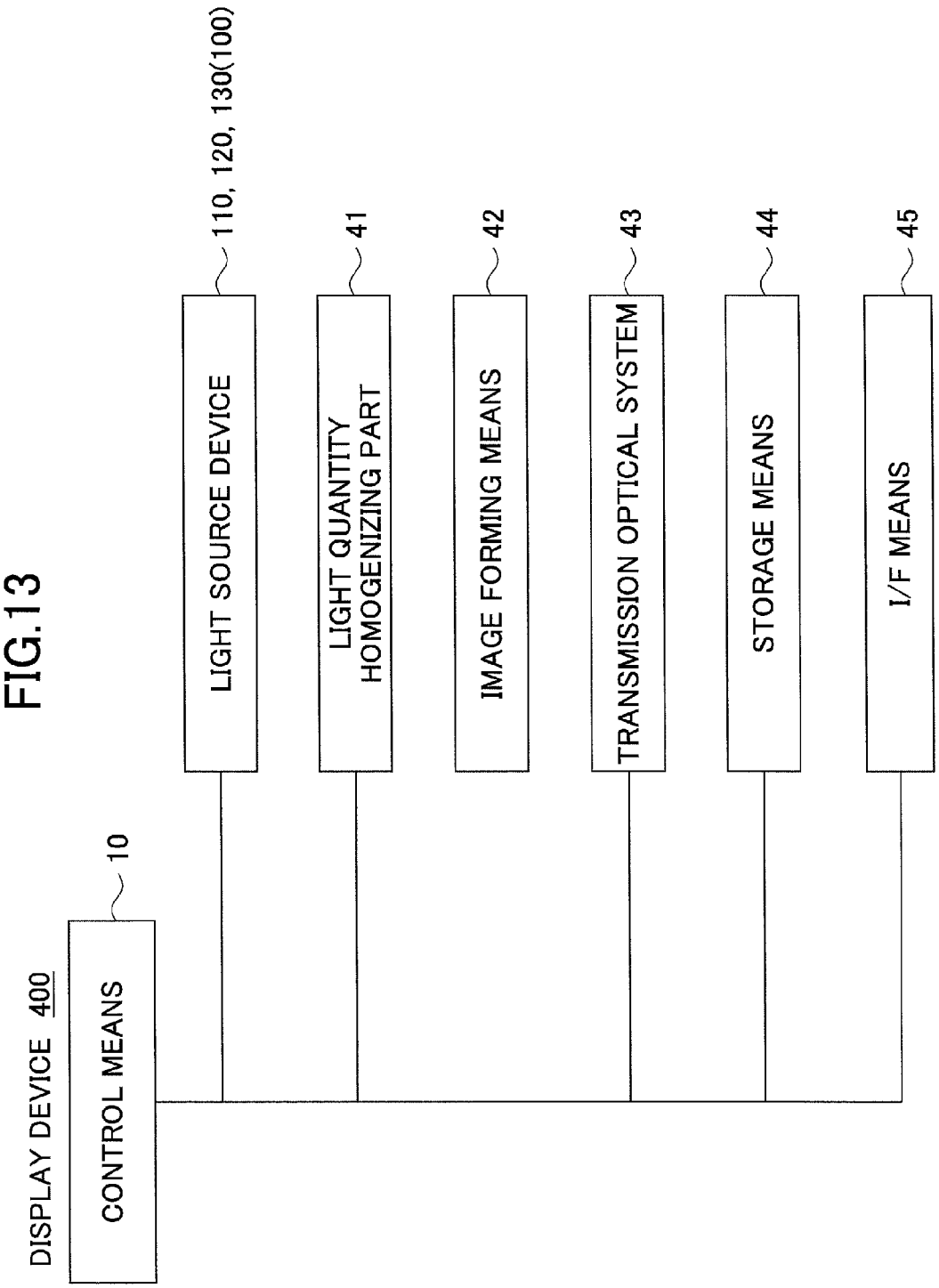

LIGHT DEFLECTOR, LIGHT SOURCE DEVICE, IMAGE PROJECTING DEVICE, AND DISPLAY DEVICE

BACKGROUND OF THE INVENTION

1. Field of the Invention

An aspect of the present invention relates to at least one of a light deflector, a light source device, an image projecting device, and a display device.

2. Description of the Related Art

A device for changing a direction of traveling of light (light deflector) may be to reflect light by using a mirror so as to deflect the light.

Japanese Patent Application Publication No. 2011-013317 discloses a technique for a light source unit (light deflector) having a light source group with a plurality of light sources being substantially arranged in a plane, a first reflection mirror group for reflecting a pencil of light rays emitted from the light source group as a pencil of light rays reduced in a direction of a column thereof, and the like.

In a case where a light beam with a substantially elliptical cross-sectional shape having a spread in one direction (for example, a semiconductor laser beam) is used as a light-emitting element (light source), it may be necessary to deflect a light beam with a substantially elliptical cross-sectional shape in order to improve an efficiency of utilization of light. For example, it may be necessary for a technique disclosed in Japanese Patent Application Publication No. 2011-013317 to arrange a mirror or the like corresponding to a substantially elliptical cross-sectional shape of a light beam emitted from a light-emitting element.

However, a technique for a light deflector in a case where a light-emitting element for emitting a light beam with a substantially elliptical cross-sectional shape is used is not described in Japanese Patent Application Publication No. 2011-013317. Furthermore, a plurality of light sources (light-emitting elements) are substantially arranged in a plane to provide a column and a row in a technique disclosed in Japanese Patent Application Publication No. 2011-013317, and hence, an efficiency of utilization of light may be degraded in a case where a light-emitting element is used for emitting a light beam with a substantially elliptical cross-sectional shape. Moreover, a plurality of light sources (light-emitting elements) are substantially arranged in a plane in a technique disclosed in Japanese Patent Application Publication No. 2011-013317, and hence, a size of a light deflector may be increased when a plurality of light-emitting elements are arranged to output a synthetic light with a higher brightness.

SUMMARY OF THE INVENTION

According to one aspect of the present invention, there is provided a light deflector including a light-emitting element configured to emit a light beam with a substantially elliptical cross-sectional shape, and a lens configured to condense light emitted from the light-emitting element, wherein an optical axis of the light-emitting element and an optical axis of the lens are decentered and a longitudinal axis of the light beam with the substantially elliptical cross-sectional shape is arranged in a direction orthogonal to a direction of decentering on the lens.

According to another aspect of the present invention, there is provided a light source device including the light deflector as described above, and a reflector configured to reflect light transmitted through a plurality of the lenses, wherein the reflector includes a first reflection part arranged at a position opposing the plurality of the light-emitting elements and a second reflection part arranged at a central portion of a substantially circular shape of the plurality of the light-emitting elements arranged in the substantially circular shape, wherein the first reflection part reflects a plurality of light beams emitted from the plurality of the light-emitting elements toward a direction of the second reflection part, and wherein the second reflection part reflects each of the plurality of light beams reflected by the first reflection part in a direction of radiation to produce synthetic light.

According to another aspect of the present invention, there is provided an image projecting device including the light source device as described above, a projection optical system configured to project an image by using the synthetic light produced by the light source device, and an image former configured to form the image to be projected.

According to another aspect of the present invention, there is provided a display device including the light source device as described above, a light quantity homogenizing part configured to homogenize a light quantity from the light source device, an image former configured to form an image by using light from the light source device, and a transmission optical system configured to transmit outputted light with a light quantity homogenized by the light quantity homogenizing part to the image former.

BRIEF DESCRIPTION OF THE DRAWINGS

FIG. 5 is a schematic configuration diagram for illustrating one example of a light source device according to Practical Example 1 in an embodiment of the present invention.

FIG. 13 is a schematic configuration diagram for illustrating one example of an image projecting device according to Practical Example 3 in an embodiment of the present invention.

DETAILED DESCRIPTION OF THE PREFERRED EMBODIMENTS

Figure 1:
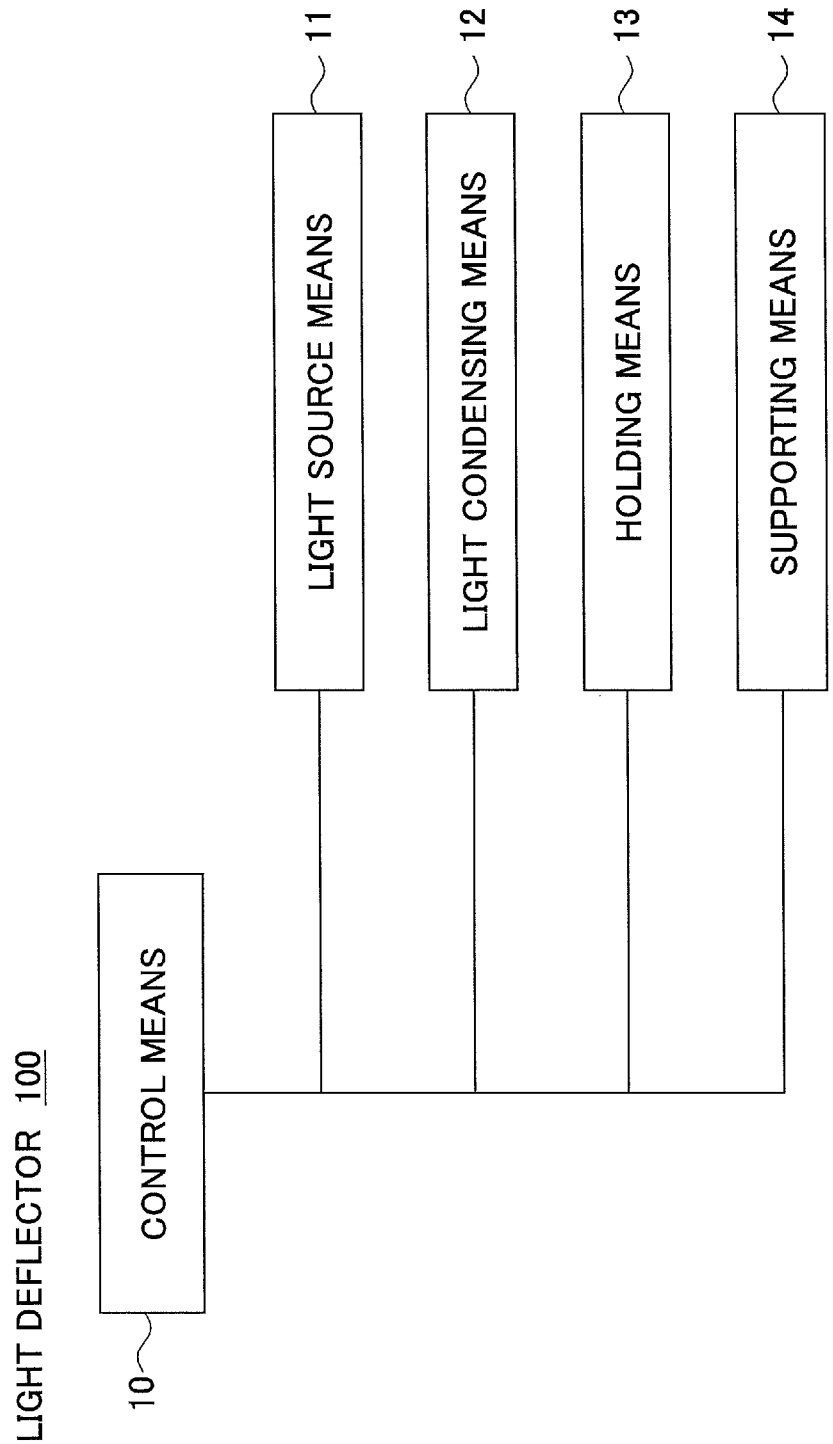
FIG. 1 is a schematic configuration diagram for illustrating one example of a light deflector according town embodiment of the present invention.

An illustrative and non-limitative embodiment of the present invention will be described by using a light deflector for changing a direction of traveling of light (a light ray) with reference to accompanying drawings. It may also be possible to use an embodiment of the present invention in a deflection mirror, a light source device, an optical scanning device, an optical writing unit, an image forming (recording) device, an image projection (projecting) device, a display device, a camera, a printer, a scanner, a facsimile machine, a bar code scanner, an on-vehicle laser radar, a wavelength variable laser, a medical laser, and others (devices, instruments, units, and the like) for changing a direction of traveling of light, as well as a light deflector that will be described below.

Additionally, identical or corresponding reference numerals are attached to identical or corresponding members or components depicted in all of accompanying drawings in the following descriptions, and redundant descriptions will be omitted. Furthermore, the drawings do not aim to illustrate a relative ratio between members or components. Therefore, it may be possible for a person skilled in the art to determine a specific dimension in light of the following non-limitative embodiment(s).

(A Configuration of a Light Deflector)

Figure 2A:
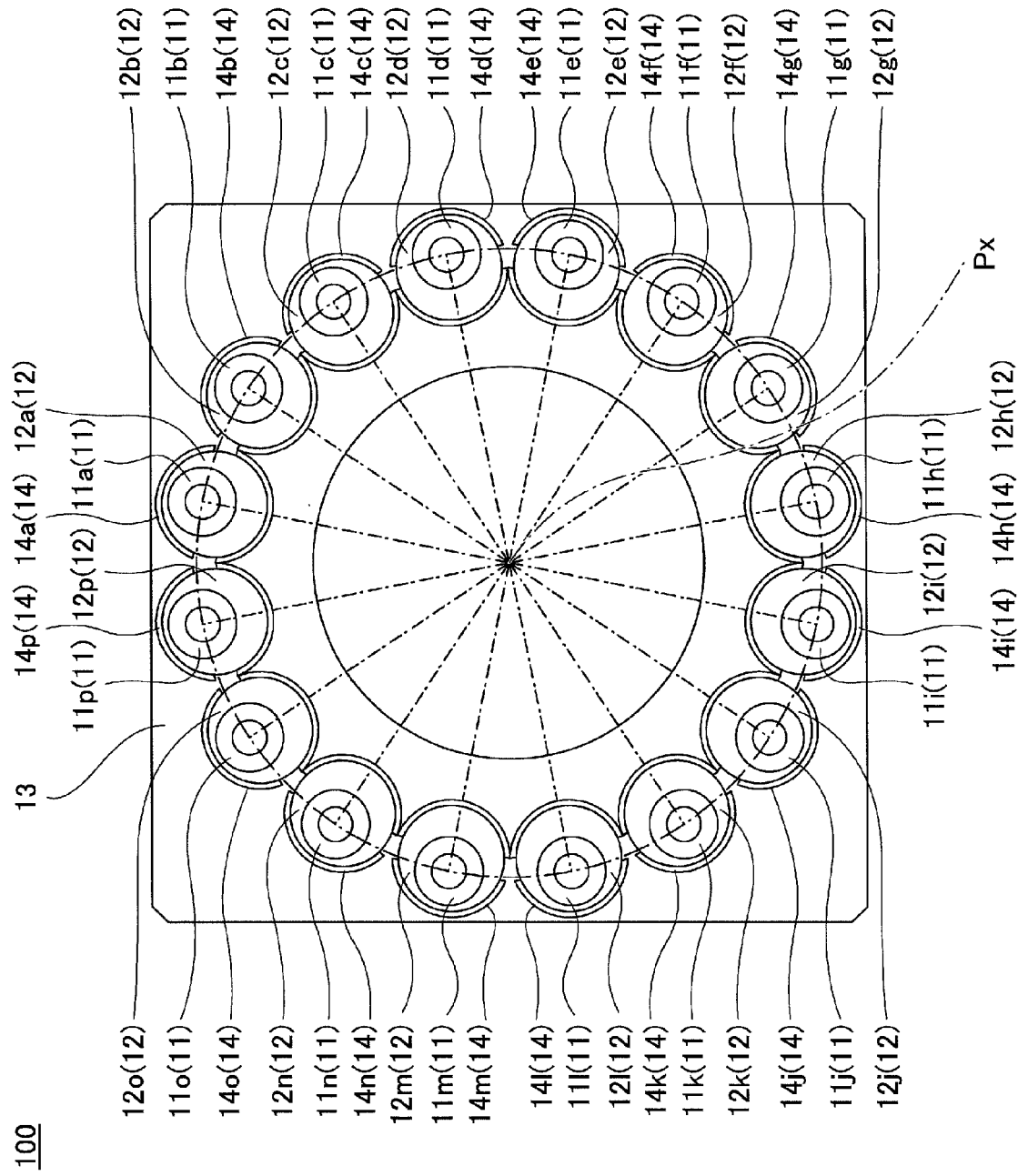
FIG. 2A and FIG. 2B are schematic outline diagrams for illustrating one example of a light deflector according to an embodiment of the present invention.
Figure 2B:
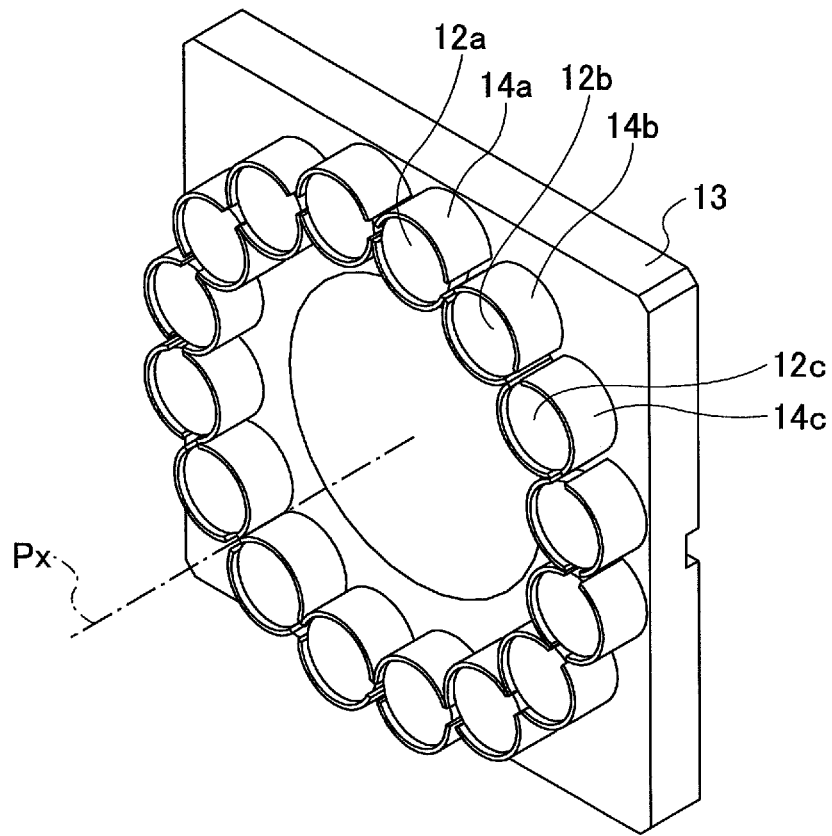
Figure 3A:
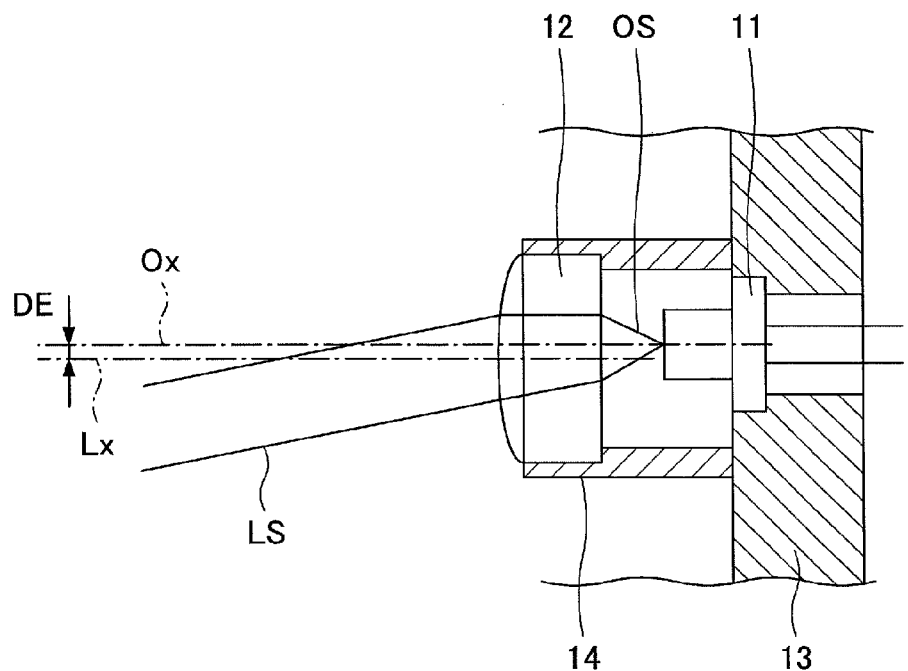
FIG. 3A and FIG. 3B are illustration diagrams for illustrating one example of an essential part of a light deflector according to an embodiment of the present invention.
Figure 3B:
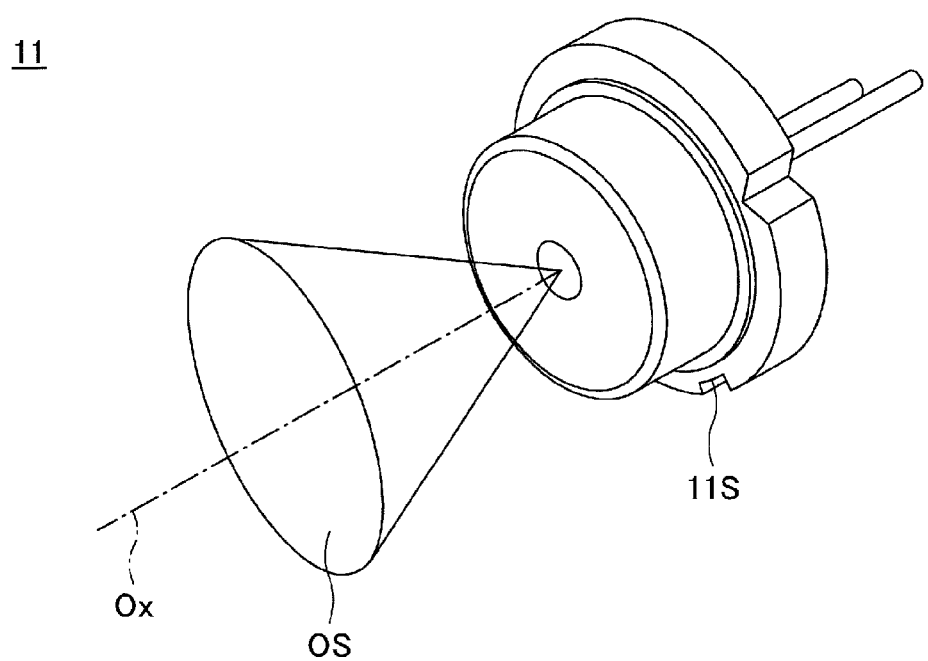

A configuration of a light deflector according to an embodiment of the present invention will be described by using FIG. 1-FIG. 4. Additionally, FIG. 2A is one example of a schematic plan view of a light deflector according to the present embodiment. FIG. 2B is one example of a schematic perspective view of a light deflector according to the present embodiment. FIG. 3A is one example of a schematic cross-sectional diagram of an essential part (a light source or the like) of a light defector according to the present embodiment. FIG. 3B is one example of a schematic perspective view of an essential part (a light source or the like) of a light deflector according to the present embodiment.

As illustrated in FIG. 1, a light deflector 100 according to the present embodiment has control means 10 for controlling an operation of the light deflector 100, light source means 11 provided with a light-emitting element for emitting light, and light condensing means 12 for condensing light emitted from a light-emitting element by using a lens. Furthermore, the light deflector 100 according to the present embodiment further has holding means 13 for holding the light source means 11 (a light-emitting element) and supporting means 14 for supporting the light condensing means 12 (a lens).

The light deflector 100 in the present embodiment conducts a change (that will be referred to as "defection", below) of a direction of traveling of light emitted from the light source means 11 (a plurality of light-emitting elements). Furthermore, the light deflector 100 condenses each of a plurality of light beams emitted from a plurality of light-emitting elements in the light source means 11 by using the light condensing means 12 (a plurality of lenses). Moreover, the light deflector 100 deflects each of a plurality of light beams in a desired output direction by using the light source means 11 and the light condensing means 12 to produce light (that will be referred to as "synthetic light", below) provided by superposing the plurality of light beams.

The control means 10 are means for instructing each component of the light deflector 100 to conduct an operation thereof, so that an operation of each component is controlled. The control means 10 in the present embodiment control operations of the light source means 11 so that it may be possible to control a timing of lighting, a light intensity (brightness), a light quantity, or the like, of a plurality of light beams emitted from a plurality of light-emitting elements in the light source means 11.

The light source means 11 are means for emitting light. The light source means 11 are provided with a plurality of light-emitting elements for emitting a plurality of light beams (or light rays) (11a-11p in FIG. 2A and FIG. 2B that will be described below). Herein, for a plurality of light beams, a light emitting element emits a plurality of light beams with a substantially elliptical cross-sectional shape having a spread in one direction (for example, LSa in FIG. 4). That is, the light source means 11 are provided with a plurality of light-emitting elements having a characteristic to emit a light beam with a substantially elliptical cross-sectional shape having a spread in one direction. For a light-emitting element, it may be possible to use, for example, a Light Emitting Diode (LED) that is a light-emitting diode, a Laser Diode (LD) that is a semiconductor laser, an organic EL, or another light-emitting member.

Additionally, when a semiconductor laser is used as a light-emitting element, the light source means 11 (the light deflector 100) may be such that the semiconductor laser is compact and a higher power, so that it may be possible to provide compact and higher-power light source means (light deflector). Furthermore, the light source means 11 (light deflector 100) may be such that semiconductor lasers are integrated at a higher density so that it may be possible to provide a further compact and higher power light source means (light deflector).

As illustrated in FIG. 2A, it may be possible for the light source means 11 to be provided with, for example, light-emitting elements 11a-11p as a plurality of light-emitting elements. Herein, the light source means 11 in the present embodiment arranges each of longitudinal axes (Mxa and Mxp in FIG. 4) of substantially elliptical cross-sectional shapes of a plurality of light beams (LSa and LSp in FIG. 4) in a direction orthogonal to a direction of deflection of a plurality of light beams (for example, an output direction Px in FIG. 4).

Additionally, a light beam emitted from the light source means 11 is not limited to one having a substantially elliptical cross-sectional shape. That is, the light source means 11 capable of using an embodiment of the present invention may be such that a cross-sectional shape of a light beam to be emitted is, for example, a complete circle, a polygonal shape, or the like. Furthermore, the light source means 11 may use respective light-emitting elements for outputting light with different colors (or wavelengths) as a plurality of light-emitting elements.

The light source means 11 according to the present embodiment are further provided with a position determining part 11S for determining a position for installing a light-emitting element 11a or the like. For example, as illustrated in FIG. 3B, it may be possible for the light source means 11 to be provided with the position determining part 11S (11Sa and 11Sp in FIG. 4) for determining positions for installing positions of light emitting elements 11a-11b.

Herein, the light source means 11 may be such that the positioning part 11S is installed on the holding means 13 at a desired position so that it may be possible to fix (determine) a position of a longitudinal axis (Mxa or the like) of a substantially elliptical cross-sectional shape of a light-emitting element (11a or the like). Thereby, it may be possible for the light deflector 100 according to the present embodiment to improve workability and a precision of installation when the light source means 11 (a plurality of light-emitting elements) are installed on the light deflector 100.

Figure 4:
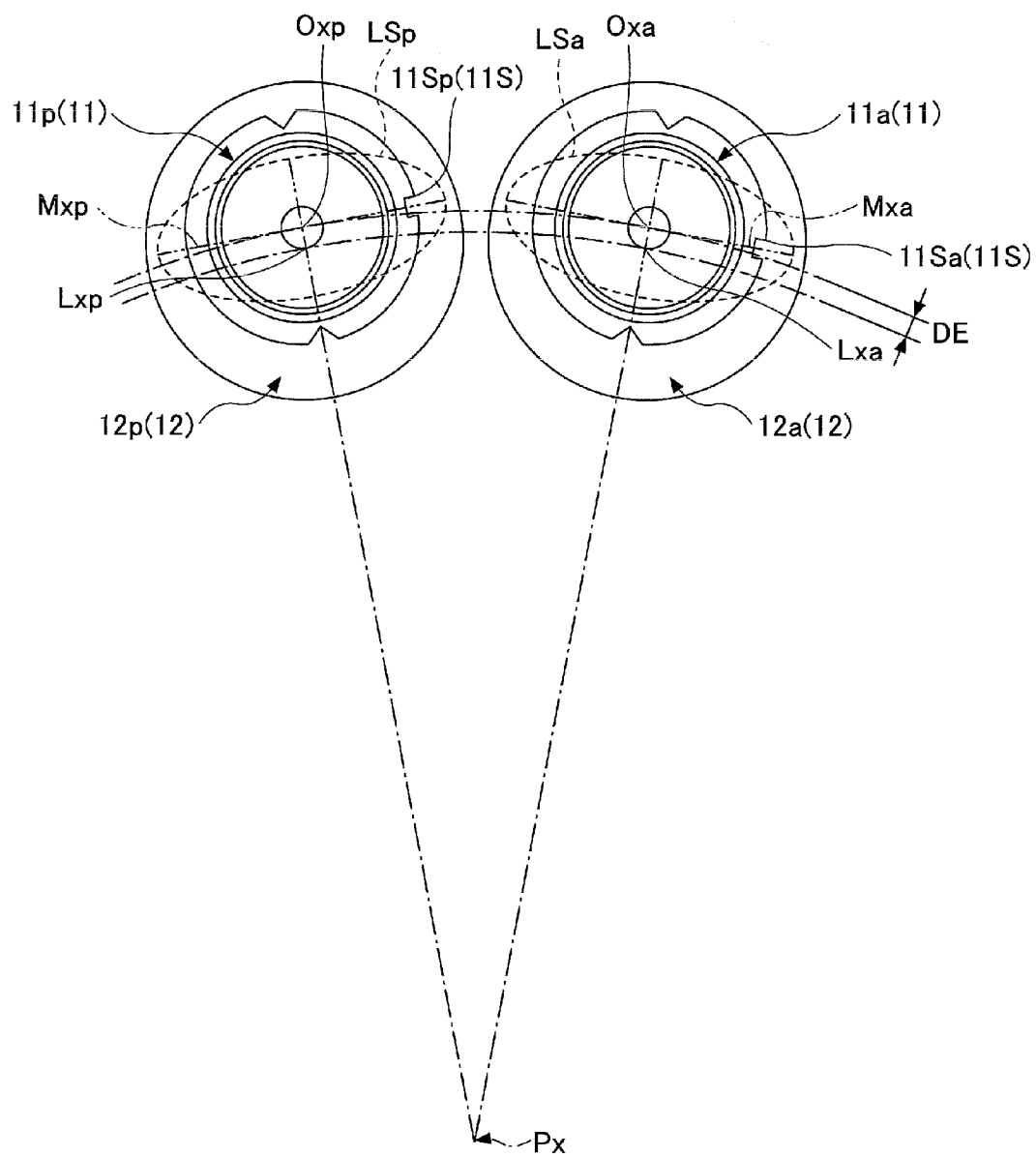
FIG. 4 is an illustration diagram for illustrating one example of arrangement of a light-emitting element in a light deflector according to an embodiment of the present invention.

Additionally, a position of the positioning part 11S is not limited to a position of an outline corresponding to a longitudinal axis illustrated in FIG. 4. That is, it may be possible for the light source means 11 capable of using an embodiment of the present invention to arrange the positioning part 11S at an arbitrary position on (an outline of) the light source means 11. Furthermore, a shape of the positioning part 11S is not limited to a shape illustrated in FIG. 4. That is, it may be possible to use a member with an arbitrary shape capable of fixing a position of a light-emitting element (for example, a protruding shape, a grooved shape, or the like) for the light source means 11 capable of using an embodiment of the present invention.

The light condensing means 12 are means for condensing each of a plurality of light beams emitted from the light source means 11 (the light-emitting element 11a or the like). It may be possible to use a plurality of lenses (for example, a light condensing lens, a collimator lens, a coupling lens, a convex lens, or the like) for the light condensing means 12 in the present embodiment.

As illustrated in FIG. 2A, it may be possible for the light condensing means 12 to be provided with light condensing lenses 12a-12p as a plurality of lenses. Specifically, the light condensing means 12 are such that each of optical axes Lx (for example, Lxa and Lxp in FIG. 4) of a plurality of lenses (12a in FIG. 4) is arranged at a position (for example, decentering DE in FIG. 3A) separating from an center Ox (for example, Oxa and Oxp in FIG. 4) of a substantially elliptical cross-sectional shape in a direction of deflection (a direction of Px in FIG. 4) by a predetermined distance DE. Thereby, it may be possible for the light deflector 100 according to the present embodiment to transmit light emitted from a light-emitting element (11a or the like) in the light source device 11 to a light condensing lens (12a or the like) in the light condensing means 12 so that it may be possible to deflect a direction of traveling of light having transmitted from the light condensing lens (that will be referred to as "transmitted light" below).

Herein, it may be possible for a predetermined distance to be a distance corresponding to a degree of deflection (for example, a deflection angle) of light emitted from the light source means 11 (the light-emitting element lie or the like). Furthermore, it may be possible for a predetermined distance to be a distance corresponding to a separation distance between the light source means 11 (the light-emitting element 11a or the like) and the light condensing means 12 (the light condensing lens 12a or the like) and a separation distance between the light condensing means 12 (the light condensing lens 12a or the like) and an output direction Px (a central axis of a pencil of light rays of outputted synthetic light). Moreover, it may be possible for a predetermined distance to be a value predetermined by an experiment, a numerical calculation, or the like.

The holding means 13 are means for holding the light source means 11. As illustrated in FIG. 2A and FIG. 2B, the holding means 13 in the present embodiment arrange and hold a plurality of light-emitting elements (11a or the like) in the light source means 11 in a substantially circular shape. Furthermore, it may be possible for the holding means 13 to fix a position of a longitudinal axis (Mxa or the like) of a substantially elliptical cross-sectional shape of a light-emitting element (11a or the like) by using a positioning part 11S (FIG. 3B) of the light source means 11.

It may be possible for the light deflector 100 according to the present embodiment to hold a plurality of light-emitting elements (11a or the like) by using the holding means 13. Furthermore, the light deflector 100 holds a plurality of light-emitting elements by using the holding means 13 so that it may be possible to conduct heat generated from a plurality of light-emitting elements to the holding means 13. Moreover, it may be possible for the light deflector 100 to conduct heat generated from a plurality of light-emitting elements to the holding means 13, so that it may be possible to diffuse heat to the holding means 13 uniformly and it may be possible to provide a substantially uniform temperature distribution of a plurality of light-emitting elements. That is, it may be possible for the light deflector 100 to suppress elevation of temperature of only a part of light-emitting elements and elevation of temperature of a plurality of light-emitting elements by using the holding means 13, so that it may be possible to improve a performance for cooling a plurality of light-emitting elements.

Furthermore, it may be possible for the light deflector 100 according to the present embodiment to press and fix a plurality of light-emitting elements (11a or the like) in the holding means 13 so that it may be possible to reduce a gap (air gap) between interfaces of a peripheral partition of a light-emitting element and the holding means 13. Accordingly, it may be possible for the light deflector 100 to reduce a gap between interfaces of a plurality of light-emitting elements and the holding means 13 so that it may be possible to reduce a contact thermal resistance and it may be possible to improve a thermal conductivity.

The supporting means 14 are means for supporting the light condensing means 12. As illustrated in FIG. 2B, the supporting means 14 in the present embodiment are provided with a plurality of supporting members 14a through 14p (also see FIG. 2A) for supporting each of a plurality of lenses (a light condensing lens 12a or the like) in the light condensing means 12.

The plurality of supporting members 14a or the like have outlines with a substantially cylindrical shape. Herein, the plurality of supporting members 14a or the like in the present embodiment support each of a plurality of lenses (the light condensing lens 12a or the like) at one end of such a substantially cylindrical shape. Furthermore, the plurality of supporting members 14a or the like are such that the other end of such a substantially cylindrical shape is fixed on the holding means 13. Moreover, the plurality of supporting members 14a or the like are such that each of a plurality of light-emitting elements (11a or the like) in the light source means 11 is arranged at the other end thereof.

Additionally, each component of the light defector 100 described above may be such that the light condensing means 12, the holding means 13, and the supporting means 14 are integrally processed (molded or the like) by a Micro Electro Mechanical Systems (MEMS) manufacturing process, a semiconductor manufacturing process, or the like. It may be possible for the light deflector 100 to integrally form (mold), for example, the holding means 13 and the supporting means 14 so that it may be possible to improve a precision of installation of the light condensing means 12 supported by the supporting means 14.

(Light Deflecting Operation)

A light deflecting operation of the light deflector 100 according to an embodiment of the present invention will be described by using FIG. 2A and FIG. 2B-FIG. 4.

Additionally, an embodiment of the light deflector 100 that outputs synthetic light in a direction of a central part (central axis Px) of a plurality of light-emitting elements (11a or the like) arranged in a circular shape will be described in the following descriptions. However, a light deflecting direction of the light deflector 100 according to an embodiment of the present invention is not limited to the direction described above. That is, it may be possible for the light deflector 100 capable of using an embodiment of the present invention to change a relative positional relationship among the light source means 11 (the light-emitting element 11a or the like), the light condensing means 12 (the light condensing lens 12a or the like), and an output direction (for example, the central axis Px), so that it may be possible to deflect light (synthetic light) in an arbitrary direction.

First, as illustrated in FIG. 2A and FIG. 3B, the light deflector 100 emits (outputs or causes light emission of) light from each of the plurality of light emitting elements 11a or the like arranged in a circular shape (the light source means 11). Then, emitted light transmits through the light condensing lens 12a or the like (the light condensing means 12). Thereby, the light deflector 100 condenses light generated from the light source means 11 to produce transmitted light that has transmitted through the light condensing lens 12a or the like. Additionally, the light deflector 100 capable of using an embodiment of the present invention may produce a collimated light (transmitted light) that has transmitted through the light condensing lens 12a or the like. Furthermore, the light deflector 100 capable of using an embodiment of the present invention may produce transmitted light other than collimated light.

Herein, as illustrated in FIG. 3A, a central axis Ox of a pencil of light rays of light OS before transmission separates from an optical axis Lx of the light condensing lens 12a or the like by a predetermined distance DE. Accordingly, transmitted light LS that has transmitted through the light condensing lens 12a or the like (the light condensing means 12) changes (deflects) a direction of traveling thereof to a direction of separation by a predetermined distance DE. That is, the light condensing means 12 (the light condensing lens 12a or the like) in the present embodiment is offset (decentered) in an output direction (a direction of a central axis Px in FIG. 4) with respect to the light source means 11, so that transmitted light LS that has transmitted through the light condensing lens 12a or the like (light condensing means 12) provides a pencil of light rays deflected in the output direction.

Next, as illustrated in FIG. 2A and FIG. 3A, the light deflector 100 radiates a plurality of transmitted light beams LS that has transmitted through a plurality of light condensing lens 12a or the like, in an output direction Px. That is, the light deflector 100 converges a plurality of transmitted light beams in an output direction Px to cause superposing thereof and produce synthetic light.

Herein, as illustrated in FIG. 4, each of a plurality of light beams emitted from a plurality of light-emitting elements (11a or the like) in the present embodiment has a substantially elliptical cross-sectional shape (Lsa and Lsp in FIG. 4). Furthermore, a longitudinal axis (Mxa and Mxp in FIG. 4) of a substantially elliptical cross-sectional shape of such a plurality of light beams is arranged in a direction orthogonal to a direction of deflection of light (an output direction Px).

Accordingly, it may be possible for the light deflector 100 according to the present embodiment to cause a plurality of light beams emitted from a plurality of light-emitting elements (11a or the like) to be incident on a plurality of light condensing lenses (12a or the like) more efficiently. Furthermore, it may be possible for the light deflector 100 to reduce a size of the light condensing means 12 (the light condensing lens 12a or the like) as compared with a case where a longitudinal axis of a substantially elliptical cross-sectional shape of light is arranged in a direction of deflection of light (an output direction Px). Furthermore, it may be possible for the light deflector 100 to reduce an optical path of transmitted light (a width of an optical path or the like) as compared with a case a longitudinal axis of a substantially elliptical cross-sectional shape of light is arranged in an output direction Px. Moreover, it may be possible for the light deflector 100 to reduce an optical path of transmitted light, so that it may be possible to increase a light intensity (brightness or density) of synthetic light to be synthesized.

Subsequently, the light deflector 100 outputs synthetic light in an output direction Px and ends an operation for deflecting light.

As described above, it may be possible for the light deflector 100 according to an embodiment of the present invention to deflect each of a plurality of light beams with a substantially elliptical cross-sectional shape to produce synthetic light in a case where (a light source having a characteristic of emission of) a light beam with a substantially elliptical cross-sectional shape (having a spread in one direction) is used. Furthermore, it may be possible for the light deflector 100 to arrange a longitudinal axis (Mx) of a generally elliptical cross-sectional shape in a direction orthogonal to a direction of deflection of light (an output direction Px), so that it may be possible to improve an efficiency of utilization of deflected light (synthetic light). Moreover, it may be possible for the light deflector 100 to arrange a longitudinal axis of a substantially elliptical cross-sectional shape in a direction orthogonal to a direction of deflection of light, so that it may be possible to reduce light (light ray) that is not capable of transmitting through the light condensing means 12.

Furthermore, it may be possible for the light deflector 100 according to an embodiment of the present invention to offset (separate) a central axis (Ox) of a pencil of light rays generated from the light source means 11 with respect to an optical axis of the light condensing means 12 (Lx of a light condensing lens), so that it may be possible to deflect transmitted light that has transmitted through the light condensing means 12. Furthermore, it may be possible to offset a central axis of a pencil of light rays generated from the light source means 11 with respect to an optical axis of the light condensing means 12 to deflect light, so that it may be possible to arrange a plurality of light-emitting elements (11a or the like) on an identical plane and in an identical output direction. That is, it may be possible for the light deflector 100 to arrange a plurality of light-emitting elements on an identical plane and in an identical output direction, so that it may be possible to miniaturize the light deflector 100. Furthermore, it may be possible for the light deflector 100 to arrange a plurality of light-emitting elements on an identical plane and in an identical output direction, so as to facilitate manufacturing thereof and have an advantageous effect with respect to improvement of productivity thereof and reduction of a cost thereof, as compared with a conventional technique.

An embodiment of the present invention will be described by using practical examples of a light source device and an image projecting device that include the light deflector 100 according to such an embodiment.

Practical Example 1

An embodiment of the present invention will be described by using the light source device 110 that includes the light deflector 100 according to such an embodiment. Herein, a light source device in the present practical example is a device for deflecting a direction of traveling of light (a light ray) generated from a light-emitting element and radiate (cause outputting of, output, or the like) light after deflection. Additionally, it may also be possible to use the light source device 110 according to the practical example for any of an optical scanning device, an image forming device, an image projection (projecting) device, a camera, a printer, a scanner, a facsimile machine, a bar code scanner, an on-vehicle laser radar, a wavelength variable laser, a medical laser, and others for radiating light having a changed direction of traveling thereof.

(Configuration of a Light Source Device)

Figure 6A:
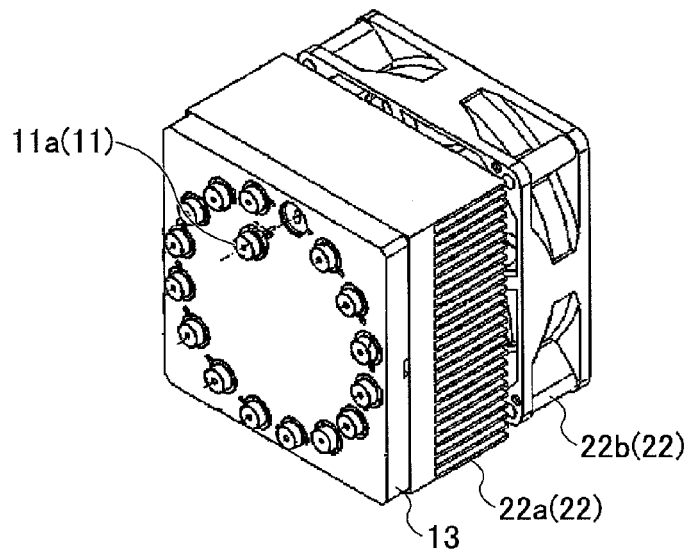
FIG. 6A and FIG. 6B are schematic outline diagrams for illustrating one example of a light source device according to Practical Example 1 in an embodiment of the present invention.
Figure 6B:
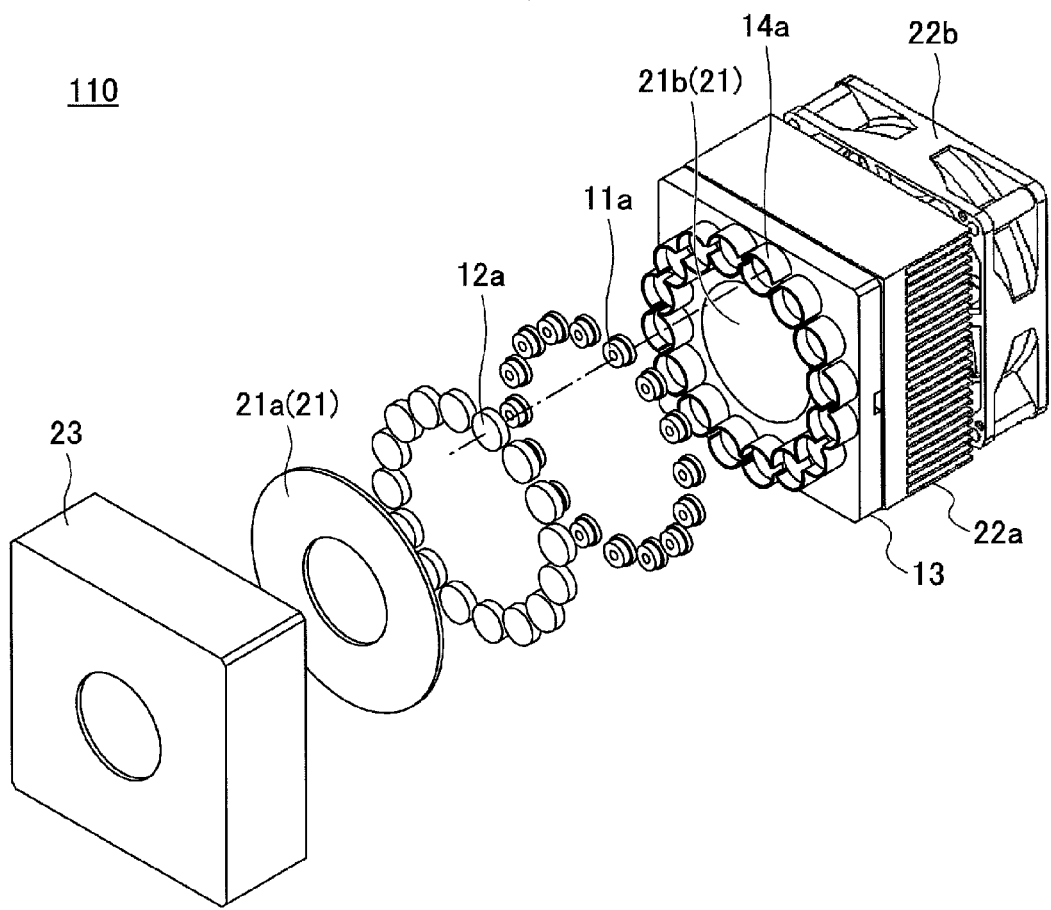

A configuration of the light source device 110 according to the present practical example will be described by using FIG. 5-FIG. 8A and FIG. 8B. Herein, FIG. 6A is one example of a schematic perspective view of the light source device 100 according to the present practical example at time of assembling thereof. FIG. 6B is one example of a schematic perspective view of the light source device 110 according to the present practical example at time of disassembling thereof. Furthermore, FIG. 8A is one example of a schematic plan view of temperature adjusting means of the light source device 110 according to the present practical example. FIG. 8B is one example of a schematic side view of temperature adjusting means of the light source device 110 according to the present practical example.

Additionally, a configuration of the light source device 110 according to the present practical example will be described mainly for a different part, because there is a part similar to the configuration of the light deflector 100 according to the embodiment described above.

As illustrated in FIG. 5, the light source device 110 according to the present practical example has a light deflector 100 (control means 10, light source means 11, light condensing means 12, holding means 13, and supporting means 14) and reflecting means 21 for reflecting transmitted light that has transmitted through the light condensing means 12. Furthermore, the light source device 110 further has temperature adjusting means 22 for adjusting temperature of the light source means 11 (the light deflector 100) and fixing means 23 for fixing a position of the light deflector or the like.

The light source device 110 in the present practical example radiates (outputs) light deflected by the light deflector 100. Furthermore, the light source device 110 reflects transmitted light that has transmitted through the light condensing means 12 by using the reflecting means 21. Moreover, the light source device 110 reflects transmitted light that has transmitted through the light condensing means 12, by using the reflecting means 21, and radiates (outputs) light reflected in a direction of radiation (an output direction).

The control means 10 are means for instructing each component of the light source device 110 to conduct an operation thereof and controlling an operation of each component. The control means in the present practical example controls an operation of the light source means 11 to control a timing of lighting, a light intensity (brightness), a quantity of light, and the like, of a plurality of light beams emitted from the light source means 11 (a plurality of light-emitting elements 11a in FIG. 6A and FIG. 6B or the like). Furthermore, the control means 10 controls an operation of the light source means 11, so that it may be possible to control a timing of outputting, a light intensity (brightness), a quantity of light, and the like, of outputted light that is outputted (radiated) by the light source means 110. Moreover, the control means 10 controls an operation of the temperature adjusting means 22 so that it may be possible to control (adjust) temperature of the light source means 11 (the light deflector 100).

The reflecting means 21 are means for reflecting light (transmitted light) that has transmitted through a plurality of lenses (the light condensing means 12). The reflecting means 21 reflect each of a plurality of transmitted light beams that have transmitted through the plurality of light condensing lenses 12a or the like, respectively. Furthermore, it may be possible for the reflecting means 21 to reflect each of a plurality of transmitted light in a desired output direction so that it may be possible to superpose a plurality of reflected light beams (that will be referred to as "reflected light" below) to produce synthetic light.

Figure 7:
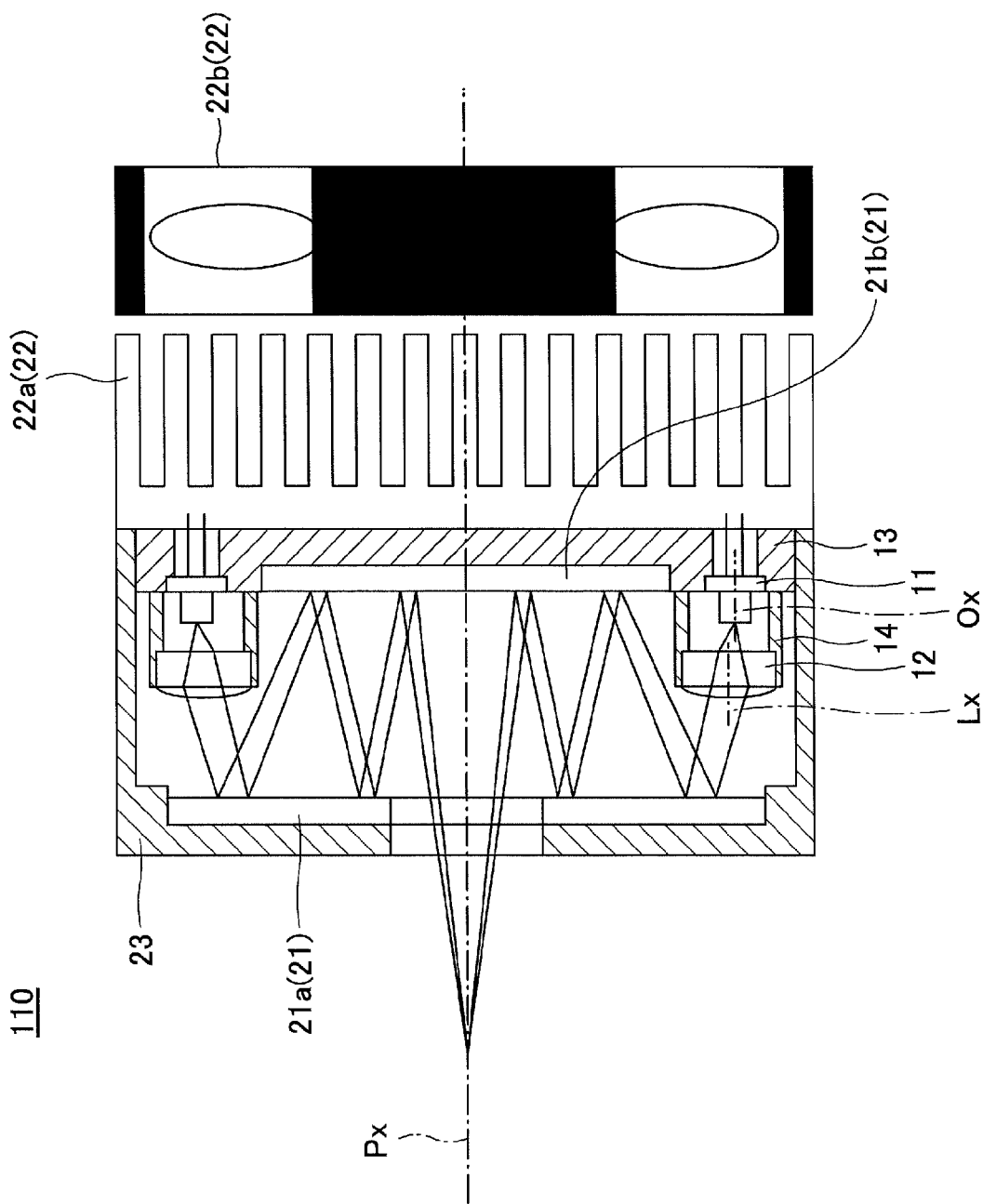
FIG. 7 is a schematic cross-sectional diagram for illustrating one example of a light source device according to Practical Example 1 in an embodiment of the present invention.
Figure 8B:
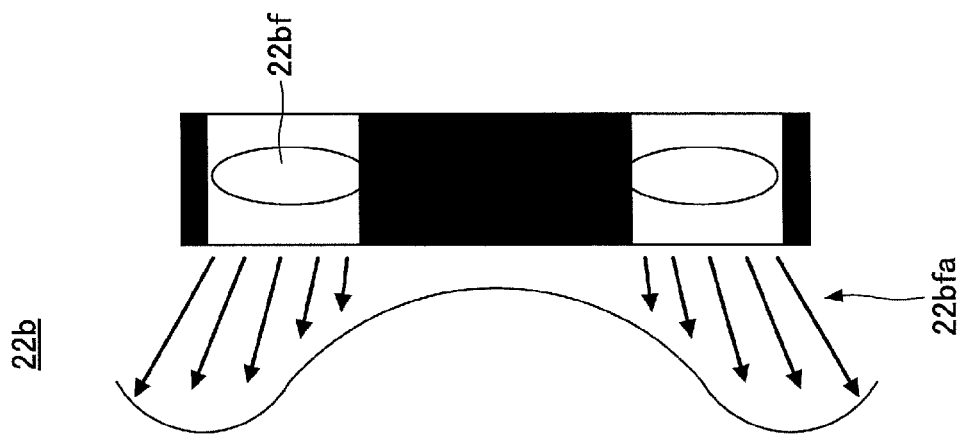
FIG. 8A and FIG. 8B are schematic outline diagrams for illustrating one example of temperature adjusting means in a light source device according to Practical Example 1 in an embodiment of the present invention.
Figure 8A:
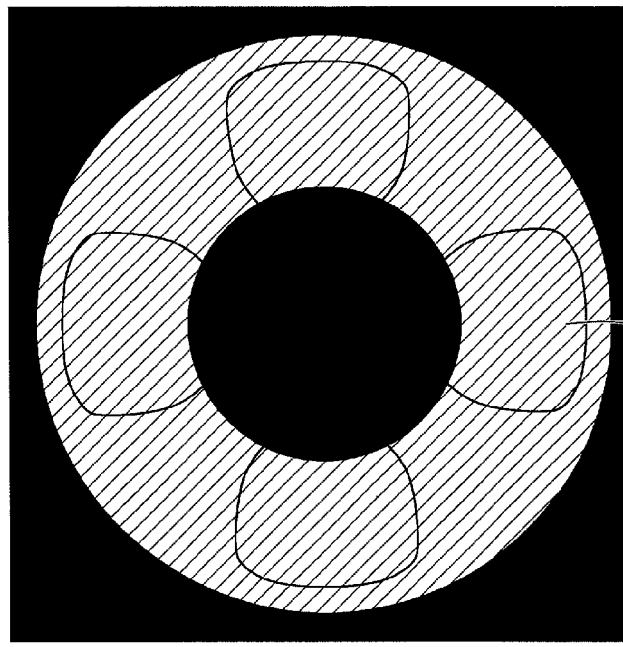

The reflecting means 21 in the present practical example are provided with a first reflection part (for example, FIG. 7) arranged at a position opposing the plurality of light-emitting elements 11a or the like (the light source means 11) and a second reflection part 21b arranged at a central part of the plurality of light sources 11a or the like (light source means 11) arranged in a substantially circular shape (for example, FIG. 7).

The first reflection part 21a is to reflect a plurality of light beams emitted from the plurality of light-emitting elements 11a or the like toward a direction of the second reflection part 21b. The first reflection part 21a in the present practical example reflects transmitted light that has each transmitted through the plurality of light condensing lenses 12a or the like in the light condensing means 12 (a plurality of light beams emitted from the plurality of light-emitting elements 11a or the like). As illustrated in FIG. 6B, it may be possible for the first reflection part 21a to use, for example, a mirror with a toric shape.

Additionally, a shape of the first reflection part 21a is not limited to a toric shape. Furthermore, a central portion of the first reflection part 21a may be, for example, a void or member capable of transmitting light (a glass plate or the like).

The second reflection part 21b is to reflect each of a plurality of light beams reflected from the first reflection part 21a in an output direction. The second reflection part 21b in the present practical example reflects a plurality of reflected light beams in a direction of radiation (for example, a direction of Px in FIG. 7) so that it may be possible to converge a plurality of reflected light beams in a direction of radiation and produce synthetic light.

For example, as illustrated in FIG. 7, it may be possible for the second reflection part 21b to output a plurality of light beams reflected from the first reflection part 21a in a direction Px of a central portion of a toric shape of the first reflection part 21a. Furthermore, as illustrated in, for example, FIG. 7, it may be possible for the reflecting means 21 (the second reflection part 21b) to reflect light multiple times in a gap between the first reflection part 21a and the second reflection part 21b and subsequently output (or radiate) reflected light in a direction Px of a central portion of a toric shape of the first reflection part 21a.

Additionally, a mirror provided by depositing a thin film of a metal (aluminum or the like) on a surface of a glass substrate or a silicon substrate may be used for the first reflection part 21a and the second reflection part 21b. Furthermore, one capable of reflecting light other than a mirror may be used for the first reflection part 21a or the like.

The temperature adjusting means 22 are means for adjusting a temperature of the light source means 11 (the light deflector 100). The temperature adjusting means 22 in the present practical example has a heat radiating member 22a for conducting heat of the light deflector 100 (the plurality of light-emitting elements 11a or the like) thereto and a cooling member 22b for cooling the heat radiating member 22a.

As illustrated in FIG. 6A, FIG. 6B and FIG. 7, the heat radiating member 22a in the present practical example is arranged at a side face of the holding means 13 at an opposite side of a direction for radiating a plurality of light-emitting elements (11a or the like). It may be possible for the heat radiating member 22a to conduct heat among a plurality of light-emitting elements, so that it may be possible to cool the light deflector 100 (a light source or the like).

As illustrated in FIG. 6A, FIG. 6B, and FIG. 7, the cooling member 22b in the present practical example is arranged at a side face of the heat radiating member 22a at an opposite side of a side for contacting the holding means 13. The cooling member 22b rotates a fan for cooling 22bf (FIG. 8A and FIG. 8B) contained therein to produce cooling air 22bfa and produced cooling air 22bfa is sent to the heat radiating member 22a. Thereby, it may be possible for the cooling member 22b to cool the light deflector 100 (the heat radiating member 22a or the like) by using cooling air 22bfa.

It may be possible for the light source device 110 according to the present practical example to send cooling air 22bfa with a substantially ring-shaped cross section (or swirling flow) by using the fan for cooling 22bf of the cooling member 22b in the temperature adjusting means 22. Thereby, it may be possible for the light source device 110 to cool the heat radiating member 22 heated correspondingly to a plurality of light-emitting elements (11a or the like) arranged in a substantially circular shape with cooling air with a substantially ring-shaped cross section by using the temperature adjusting means 22. That is, it may be possible for the light source device 110 to cool with cooling air with a substantially ring-shaped cross section by using the temperature adjusting means 22, so that it may be possible to improve an efficiency of cooling of the light source means 11 (the light deflector 100).

The fixing means 23 are means for fixing a position of the light deflector 100 or the like. As illustrated in FIG. 6A, FIG. 6B, and FIG. 7, the fixing means 23 in the present practical example fixes the holding means 13 and the heat radiating member 22a (the temperature adjusting means 22).

(Operation for Radiating Light)

An operation of the light source device 110 according to Practical Example 1 in an embodiment of the present invention for radiating light will be described by using FIG. 7.

Additionally, an example of the light source device 110 for radiating synthetic light in a direction of a central axis Px of a plurality of light-emitting elements (11a or the like) arranged in a circular shape will be described in the following descriptions. However, a direction of light radiation of the light source device 110 according to an embodiment of the present invention is not limited to the direction described above.

First, as illustrated in FIG. 6A, FIG. 6B, and FIG. 7, the light source device 110 emits light (a light ray) from each of the plurality of light-emitting elements 11a or the like (the light source means 11) arranged in a circular shape. Herein, emitted light transmits through the light condensing lens 12a or the like (the light condensing means 12). Thereby, the light source device 110 condenses light emitted from the light source means 11 and produces transmitted light that has transmitted through the light condensing lens 12a or the like, similarly to the light deflector 100 in the embodiment described above. Furthermore, a direction of traveling of transmitted light that has transmitted through the light condensing lens 12a or the like (the light condensing means 12) is changed (deflected) to a direction of separation by a predetermined distance (DE in FIG. 3A), similarly to the light deflector 100 in the embodiment described above.

Then, the light source device 110 reflects a plurality of transmitted light beams that have transmitted through the plurality of light condensing lenses 12a or the like, by the first reflection part 21a in the reflecting means 21. Herein, the light source device 110 reflects a plurality of transmitted light beams toward a direction of the second reflection part 21b. Then, the light source device 110 further reflects, by the second reflection part 21b, a plurality of light (transmitted light) beams reflected by the first reflection part 21a. Herein, the light source device 110 reflects a plurality of further reflected light beams toward the first reflection part 21a by the second reflection part 21b. Subsequently, the light source device 110 similarly reflects light by the first reflection part 21a and radiates further reflected light toward a direction of radiation Px by the second reflection part 21b.

That is, the light source device 110 reflects light (transmitted light) in a gap between the first reflection part 21a and the second reflection part 21b multiple times and subsequently outputs (radiates) reflected light in a direction Px of a central portion of a ring shape of the first reflection part 21a (a direction of radiation). Thereby, it may be possible for the light source device 110 according to the present practical example to converge and superpose a plurality of light beams emitted from a plurality of light-emitting elements in a direction of radiation Px so that it may be possible to produce synthetic light (radiation light).

Herein, the light source device 110 according to an embodiment of the present practical example arranges a longitudinal axis (Mxa or Mxp in FIG. 4) of a substantially elliptical cross-sectional shape of a plurality of light beams in a direction orthogonal to a direction of radiation Px, similarly to the case of the light deflector 100 according to the embodiment described above. Accordingly, it may be possible for the light source device 110 to cause a plurality of light beams emitted from a plurality of light-emitting elements (11a or the like) to be incident on a plurality of light condensing lenses (12a or the like) more efficiently. Furthermore, it may be possible for the light source device 110 to reduce a size of the light condensing means 12 (the light condensing lenses 12a or the like) as compared with a case where a longitudinal axis of a substantially elliptical cross-sectional shape of a light beam is arranged in a direction of radiation Px. Furthermore, it may be possible for the light source device 110 to reduce an optical path of transmitted light, as compared with a case where a longitudinal axis of a substantially elliptical cross-sectional shape of a light beam is arranged in a direction of radiation Px. Moreover, it may be possible for the light source device 110 to reduce an optical path of transmitted light, so that it may be possible to improve a light intensity (brightness) of synthetic light to be synthesized.

As described above, it may be possible for the light source device 110 according to Practical Example 1 in an embodiment of the present invention to obtain an effect similar to that of the light deflector 100 according to the embodiment described above.

Furthermore, it may be possible for the light source device 110 according to the present practical example to reflect transmitted light by using the reflecting means 21, so that it may be possible to increase a degree of deflection of a plurality of light beams emitted from a plurality of light-emitting elements (11a or the like) (an angle, a position, or the like, of deflection). That is, it may be possible for the light source device 110 to increase a degree of deflection of a plurality of light beams emitted from a plurality of light-emitting elements by using the reflecting means 21, so that it may be possible to miniaturize the light source device 110.

Moreover, it may be possible for the light source device 110 according to the present practical example to cool the heat radiating member 22a heated correspondingly to a plurality of light-emitting elements arranged in a substantially circular shape, with cooling air with a substantially ring-shaped cross section by using the temperature adjusting means 22. That is, it may be possible for the light source device 110 to cool the heat radiating member 22 heated in a substantially circular shape, by using the temperature adjusting means 22, so that it may be possible to improve en efficiency of cooling of a light deflector (a light source or the like).

Variation Example 1 of Practical Example 1

An embodiment of the present invention will be described by using a light source device 120 according to Variation Example 1 of Practical Example 1 in an embodiment of the present invention.

(Configuration of a Light Source Device) and (Operation for Radiating Light)

Figure 9:
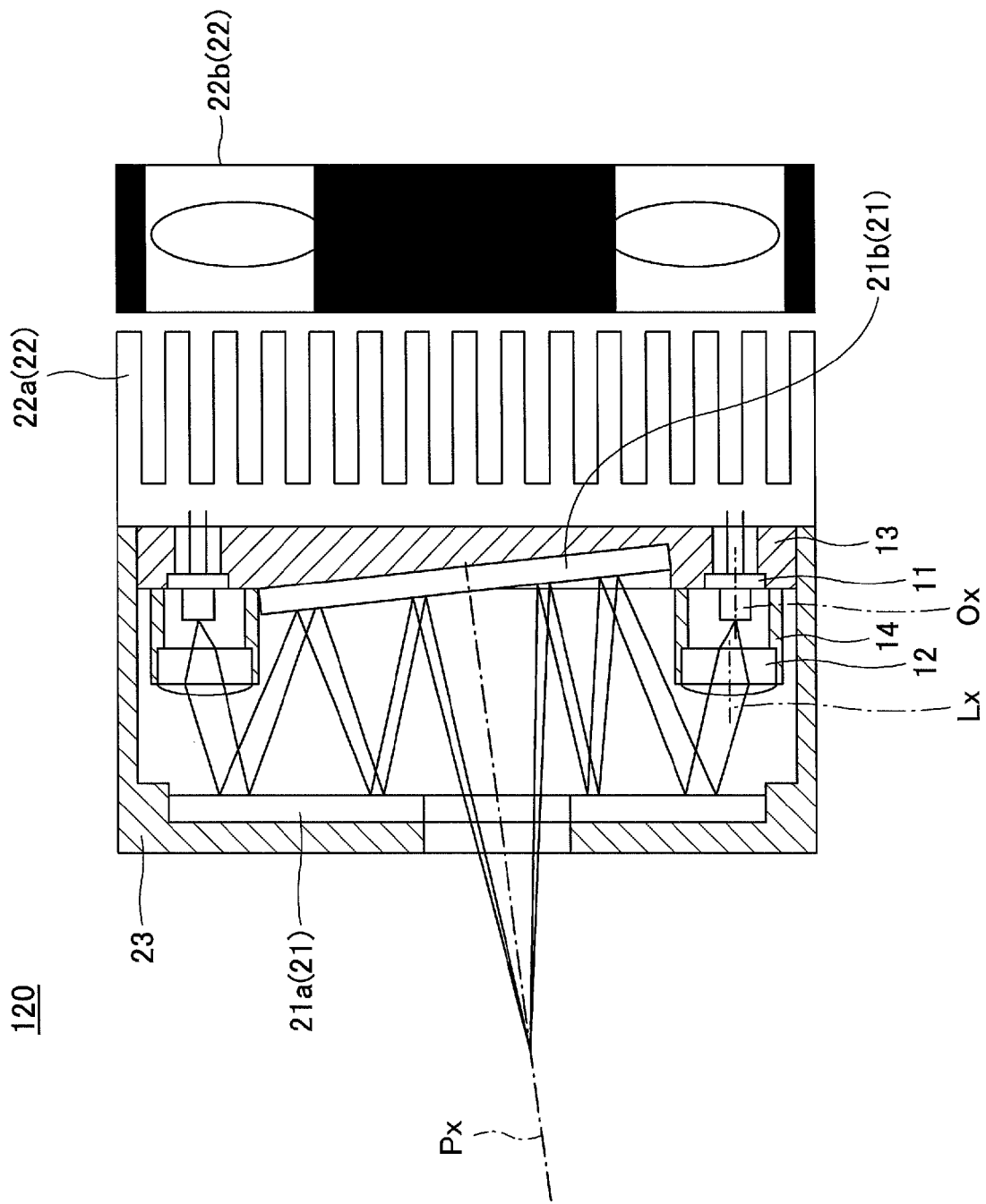
FIG. 9 is a schematic cross-sectional diagram for illustrating one example of a light source device according to Variation Example 1 of Practical Example 1 in an embodiment of the present invention.

FIG. 5 and FIG. 9 illustrate a configuration or the like of the light source device 120 according to the present variation example. A configuration or the like of the light source device 120 according to the present variation example is basically similar to the configuration or the like of the light source device 110 according to Practical Example 1, so that different parts will mainly be described.

As illustrated in FIG. 9, in the light source device 120 according to the present variation example is such that the second reflection part 21b in the reflecting means 21 is arranged to be inclined by a predetermined angle with respect to a plane for arranging the plurality of light-emitting elements 11a or the like. Herein, it may be possible for a predetermined angle to be an angle corresponding to a direction of radiation of light from the light source device 120. Furthermore, it may be possible for a predetermined angle to be an angle corresponding to a predetermined distance between a central axis Ox of the light source means 11 and an optical axis Lx of the light condensing means 12 and other specifications of the light source device 120. Moreover, it may be possible for a predetermined angle to be an angle that is preliminarily determined by an experiment, a numerical calculation, or the like.

It may be possible for the light source device 120 in the present variation example to be arranged so as to incline the second reflection part 21b in the reflecting means 21 by a predetermined angle, so that it may be possible to set (change) a direction of light (radiation light) radiated by the light source device 120. That is, for the light source device 120, it may be possible to arrange the second reflection part 21b at an arbitrary angle, so that it may be possible to radiate radiation light (synthetic light) in a desired direction.

As described above, it may be possible for the light source device 120 according to Variation Example 1 of Practical Example 1 in an embodiment of the present invention to obtain an effect similar to those of the light deflector 100 according to the embodiment described above and the light source device 110 according to Practical Example 1.

Variation Example 2 of Practical Example 1

An embodiment of the present invention will be described by using a light source device 130 according to Variation Example 2 of Practical Example 1 in an embodiment of the present invention.

(Configuration of a Light Source Device) and (Operation for Radiating Light)

Figure 10:
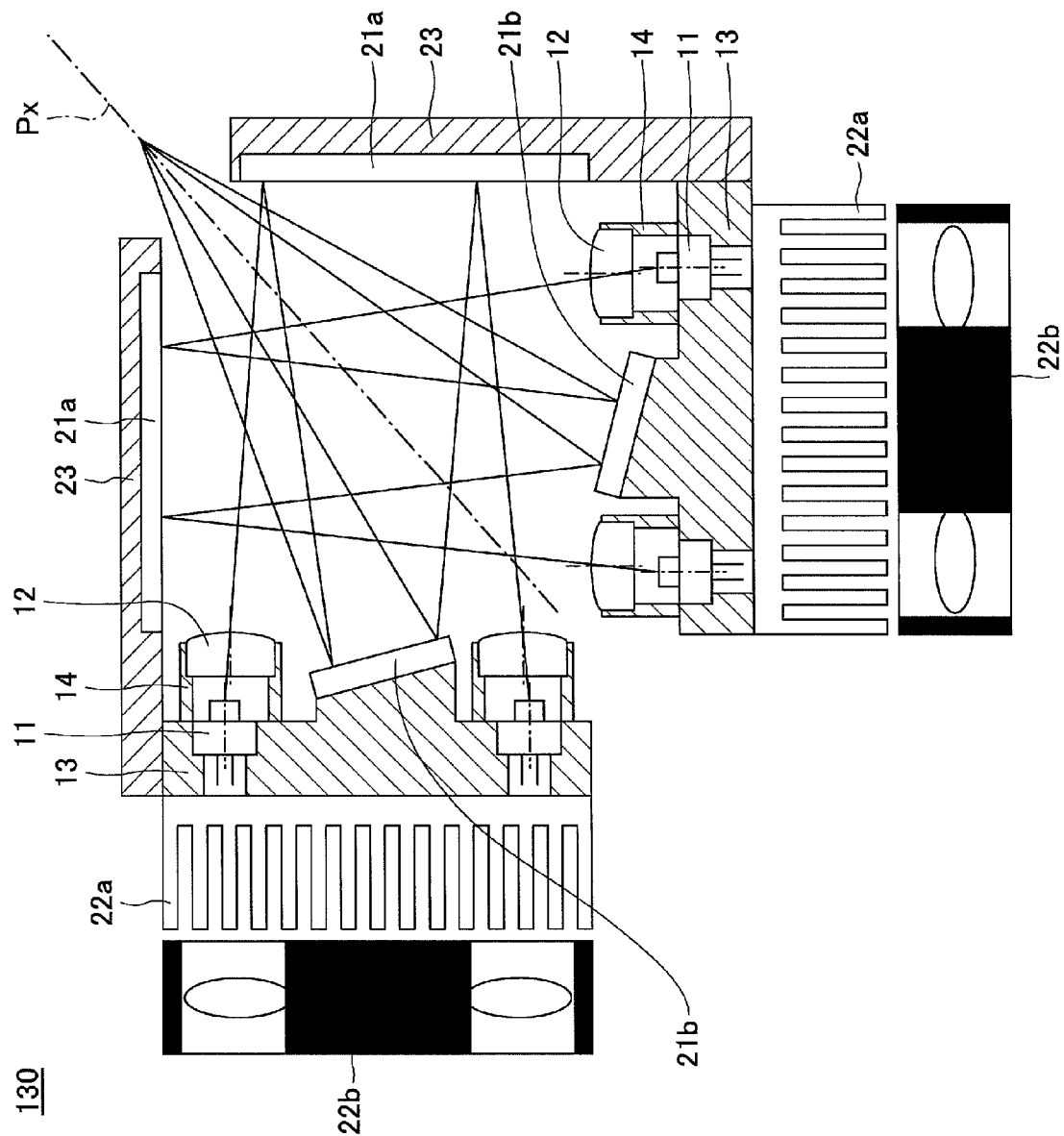
FIG. 10 is a schematic cross-sectional diagram for illustrating one example of a light source device according to Variation Example 2 of Practical Example 1 in an embodiment of the present invention.

FIG. 5 and FIG. 10 illustrate a configuration or the like of the light source device 130 according to the present variation example. A configuration or the like of the light source device 130 according to the present variation example is basically similar to the configuration or the like of the light source device 110 according to Practical Example 1, so that different parts will mainly be described.

As illustrated in FIG. 10, the light source device 130 according to the present variation example has two light deflectors 100 (light source means 11, light condensing means 12, holding means 13, and supporting means 14), two reflecting means 21, two temperature adjusting means 22, and two fixing means 23. That is, it may be possible for the light source device 130 to use two light source means 11 so that it may be possible to radiate light at a higher brightness (emit light with a higher power).

Specifically, the light source device 130 in the present variation example is such that two second reflection parts 21b are arranged to be inclined by a predetermined angle so that light outputted from the two light source means 11 is converged and superposed in a direction of radiation Px to produce synthetic light. Furthermore, it may be possible for the light source device 130 to radiate (emit) synthesized synthetic light in a direction of radiation Px as radiation light.

As described above, it may be possible for the light source device 130 according to Variation Example 2 of Practical Example 1 in an embodiment of the present invention to obtain an effect similar to those of the light deflector 100 according to the embodiment described above, the light source device 110 according to Practical Example 1, and the light source device 120 according to the variation example thereof.

Furthermore, it may be possible for the light source device 130 according to the present variation example to synthesize a plurality of outputted light beams by using the two light source means 11, so that it may be possible to radiate light with a higher power (radiation light). Moreover, it may be possible for the light source device 130 according to the present variable example to synthesize a plurality of outputted light beams by using the two light source means 11, so that it may be possible to miniaturize a light source device as compared with a case where light is synthesized by using two light deflectors (light source devices).

Practical Example 2

An embodiment of the present invention will be described by using a practical example of an image projecting device 140 provided with a light source device (110, 120, or 130) according to Practical Example 1. Herein, an image projecting device in the present practical example is a device for projecting (conducting projection of) an image (including a video image) onto a projection object (an object to be projected onto). Additionally, it may also be possible to use the image projecting device 140 according to an embodiment of the present invention to any of a projection device, a projecting device, a projector, and others for projecting (conducting enlarging projection, projection, or the like) an image onto an object by using deflected light.

(Configuration of an Image Projecting Device)

A configuration of the image projecting device 140 according to Practical Example 2 in an embodiment of the present invention will be described by using FIG. 11. Additionally, a configuration of the image projecting device 140 according to the present practical example includes the configuration of the light source device (110 or the like) according to Practical Example 1, so that different parts will mainly be described in the following descriptions.

Figure 11:
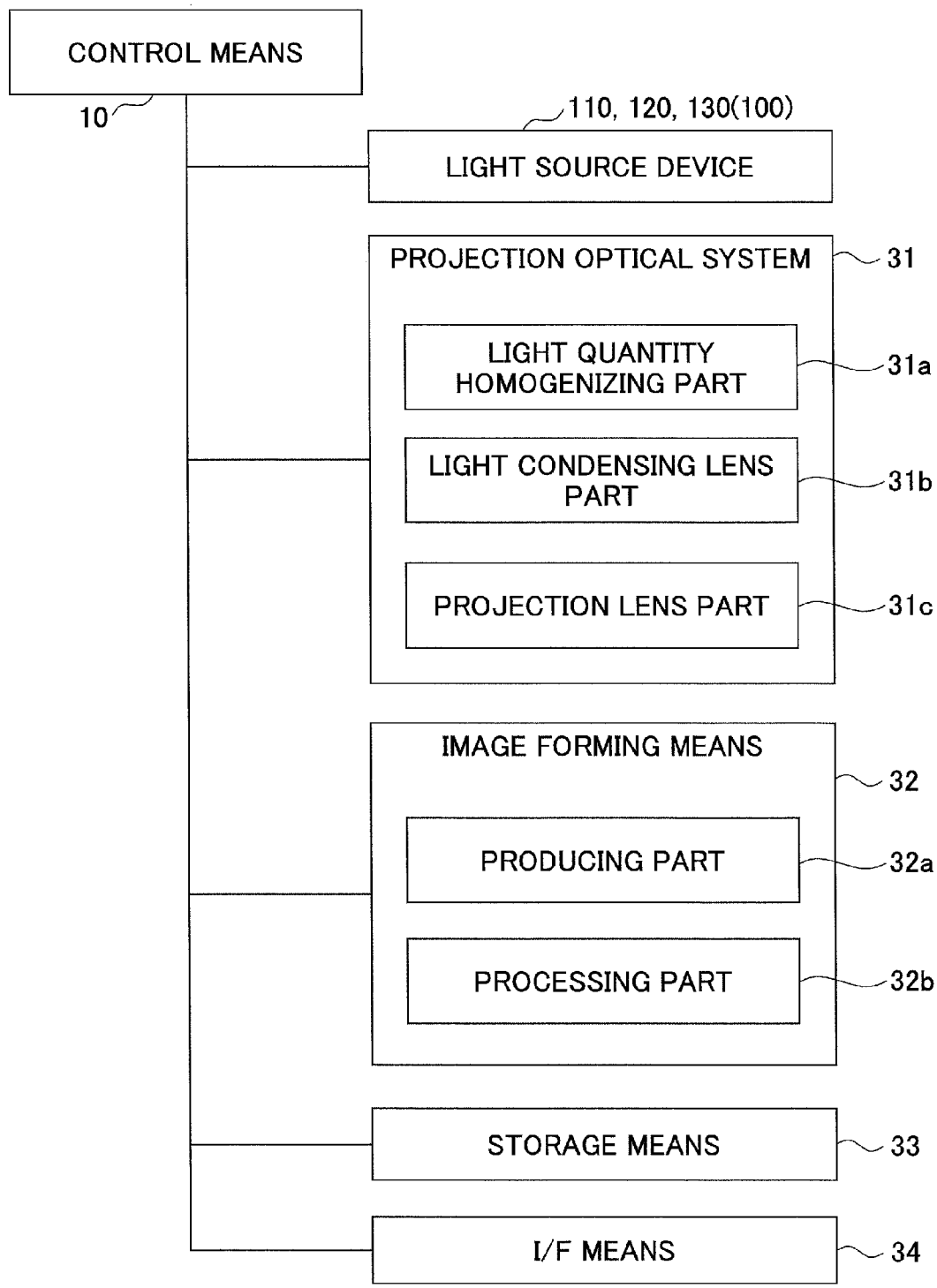
FIG. 11 is a schematic configuration diagram for illustrating one example of an image projecting device according to Practical Example 2 in an embodiment of the present invention.

As illustrated in FIG. 11, the image projecting device 140 according to the present practical example is provided with the light source device (110, 120, or 130) according to Practical Example 1. Furthermore, the image projecting device 140 has a projection optical system 31 for projecting an image by using synthetic light (radiation light) synthesized by the light source device (110 or the like) and image forming means 32 for forming an image to be projected. Moreover, the image projecting device 140 further has storage means 33 for storing an operation state, an operation condition, and the like of the image projecting device 140 and interface (I/F) means 34 for conducting an input or an output of information with an exterior of the image projecting device 140.

The control means 10 are means for instructing each component of the image projecting device 140 to conduct an operation so that the operation of each component is controlled. The control means 10 in the present practical example controls an operation of the light source device (110 or the like) so that a timing of lighting, a light intensity (brightness), a quantity of light, and the like of a plurality of light beams emitted from the light source means 11 (a plurality of light-emitting elements 11a or the like in FIG. 6) are controlled. Furthermore, it may be possible for the control means 10 to control an operation of a light source device (110 or the like), so that it may be possible to control a timing of outputting, a light intensity (brightness), a quantity of light, and the like of outputted light outputted from the light source device (110 or the like). Moreover, it may be possible for the control means 10 to control operations of the projection optical system 31 and image forming means 32, so that it may be possible to control an operation for an image to be projected (for example, a lightness or a size of an image to be projected).

Additionally, the control means 10 may control operations of the projection optical system 31, the image forming means 32, and the like, by using a program (a control program, an application, or the like) stored preliminarily (for example, in a storage means 33). Furthermore, the control means 10 may control operations of the projection optical system 31, the image forming means 32, and the like, based on information or the like inputted from the I/F means 34 (an input part or the like).

The projection optical system 31 is means for projecting an image onto a projection object by using synthetic light synthesized by a light source device. The projection optical system 31 in the present practical example is provided with a light quantity homogenizing part 31a for homogenizing a quantity of light of a pencil of light rays of synthetic light, a light condensing lens part 31b for radiating light homogenized by the light quantity homogenizing part 31a onto an image formed by the image forming means 32, and a projection lens part 31c for projecting light that has transmitted through an image.

The light quantity homogenizing part 31a is to homogenize color synthesis, a light quantity, a brightness, a lightness, or the like of a pencil of light rays of synthetic light. It may be possible to use, for example, a rod integrator (a prismatic lens or the like) for the light quantity homogenizing part 31a. Herein, a rod integrator is to totally reflect light incident on one end of a rectangular parallelepiped body (a quadrangular prism or the like) of a glass or the like inside the rectangular parallelepiped body, so that a brightness distribution (a luminous intensity distribution or the like) of light emitted from the other end of the rectangular parallelepiped body is homogenized.

The light condensing lens part 31b is to radiate light emitted from the light quantity homogenizing part 31a onto an image formed by the image forming means 32. The light condensing lens part 31b in the present practical example radiates light homogenized by the light quantity homogenizing part 31a onto an image formed by the image forming means 32 (for example, an image panel). It may be possible to use, for example, a relay lens for the light condensing lens part 31b.

The projection lens part 31c is to project light having transmitted through an image (that will be referred to as "projection light" below). The projection lens part 31c in the present practical example images projection light having transmitted through an image formed by the image forming means 32 onto a surface of a projection object. For the projection lens part 31c, an image may be enlarged (or reduced) and projected by using a plurality of lenses.

The image forming means 32 are means for forming an image to be projected. The image forming means 32 in the present practical example are provided with a producing part 32 for producing an image to be projected and a processing part 32b for processing a produced image.

The producing part 32a produces an image to be projected, based on information stored in the storage means 33 and/or information inputted by the I/F means 34. Furthermore, the producing part 32a displays an image produced on a transmission-type image panel that conducts image formation depending on a modulation signal. Additionally, the producing part 32a may also display an image produced on a reflection-type panel or a micro-mirror device (DMD)-type panel other than an image panel.

The processing part 32 processes (edits, transforms, adjusts, conducts keystone correction, or the like) a produced image, based on projecting conditions (a distance to a projection object, a relatively positional relationship, and the like).

The storage means 33 are means for storing information for the image projecting device 140 (for example, "information for an operation", "information for a state", or "information for processing") or the like. It may be possible to use a publicly known technique (a hard disk, a memory, a ROM, a RAM, or the like) for the storage means 33.

The I/F means 34 are means for conducting an input or output of information (for example, an electric signal) between the image projecting device 140 and an exterior of the image projecting device 140. It may be possible for the I/F means 34 to input information for an image to be projected or the like from an external device (a personal computer (PC) or the like). Furthermore, it may be possible for the I/F means 34 to output information for the image projecting device 140 or the like to an external device (a PC or the like). It may be possible for the I/F means 34 to include an input part for inputting information from an exterior of the image projecting device 140 (for example, a user interface such as an operation panel) by a user. Furthermore, it may be possible for the I/F means 34 to include an output part for outputting (displaying) information to an exterior of the image projecting device 140 (for example, a display part such as a touch panel).

(Operation for Projecting an Image)

An operation of the image projecting device 140 according to Practical Example 2 in an embodiment of the present invention to project an image will be described by using FIG. 12.

Figure 12:
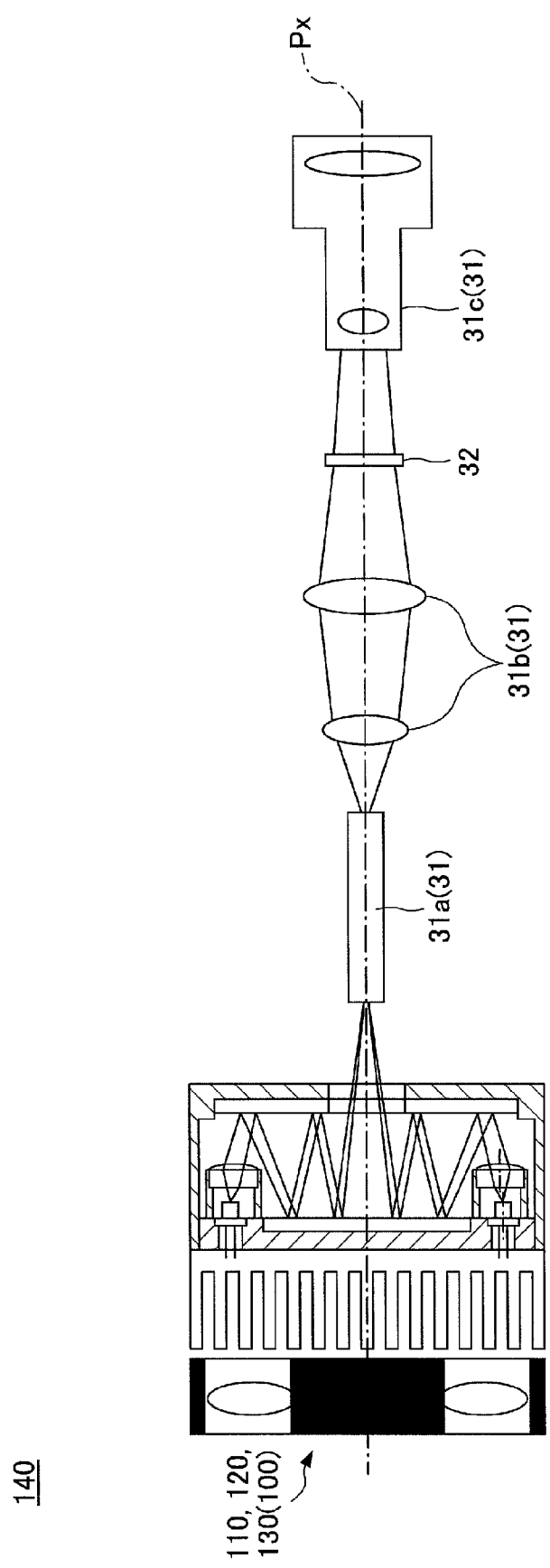
FIG. 12 is a schematic system diagram for illustrating one example of an image projecting device according to Practical Example 2 in an embodiment of the present invention.

First, as illustrated in FIG. 12, the image projecting device 140 synthesizes light emitted from a plurality of light-emitting elements (11a or the like) to produce synthetic light by using a light source device (110 or the like) similarly to the case of Practical Example 1. Then, produced synthetic light (radiation light) is incident on the light quantity homogenizing part 31a in the projection optical system 31.

Herein, it may be possible for the image projecting device 140 in the present practical example to synthesize a plurality of light beams from a plurality of light sources by using a light source device (110 or the like), so that it may be possible to produce synthetic light with a smaller cross section of a pencil of light rays. That is, it may be possible for the image projecting device 140 to produce synthetic light at a higher density (higher brightness) by using a light source device (110 or the like).

Thereby, it may be possible for the image projecting device 140 according to the present practical example to reduce an incident angle of synthetic light incident on the projection optical system 31 (the light quantity homogenizing part 31a). Furthermore, it may be possible for the image projecting device 140 to reduce an incident angle of synthetic light incident on the projection optical system 31 (the light quantity homogenizing part 31a) so that it may be possible to reduce diffusion of light radiated onto the image forming means 32 (an image panel). Moreover, it may be possible for the image projecting device 140 to reduce diffusion of light radiated onto the image forming means 32 (an image panel) so that it may be possible to use a projection lens with a smaller numerical aperture (NA) (or a larger F-number). That is, it may be possible for the image projecting device 140 to facilitate a design and manufacturing of a lens for the projection lens part 31c and it may also be possible to readily ensure an image quality.

Then, the image projecting device 140 homogenizes color synthesis or the like of synthetic light incident on the light quantity homogenizing part 31a by using the light quantity homogenizing part 31a. Subsequently, the image projecting device 140 outputs homogenized light to the light condensing lens part 31b.

Then, in the image projecting device 140, homogenized light transmits through the light condensing part 31b and transmitted light is radiated onto the image forming means 32 (an image panel). Herein, transmitted light radiated onto the image forming means 32 (an image panel) further transmits through the image panel (image forming means 32) and light (projection light) corresponding to an image produced by the producing part 32a is produced. Subsequently, the image projecting device 140 outputs projection light to the projection lens part 31c.

Subsequently, the image projecting device 140 projects projection light onto a projection object by using the projection lens part 31c. Thereby, it may be possible for the image projecting device 140 to project an image corresponding to an image produced by the image forming means 32 (producing part 32a) onto a surface of a projection object.

As described above, it may be possible for the image projecting device 140 according to Practical Example 2 in an embodiment of the present invention to obtain an effect similar to those of the light deflector 100 according to the embodiment described above, the light source device 110 according to Practical Example 1, and the light source device 120 or 130 according to the variation example thereof.

Furthermore, it may be possible for the image projecting device 140 according to the present practical example to reduce an incident angle of synthetic light incident on the projection optical system 31 (a rod integrator or the like), so that it may be possible to use a projection lens with a smaller NA (a larger F-number) or the like. That is, it may be possible for the image projecting device 140 according to the present practical example to facilitate a design and manufacturing of a projection optical system, improve an efficiency of cooling, and improve an efficiency of utilization of light. Furthermore, it may be possible for the image projecting device 140 according to the present practical example to improve an efficiency of utilization of light, so that it may be possible to attain reduced electric power consumption and it may be possible to realize a more compact, lighter-weight, and higher intensity device.

Practical Example 3

An embodiment of the present invention will be described by using a practical example of a display device provided with the light source device (110, 120, or 130) according to Practical Example 1. Herein, a display device is a device for displaying an image (including a video image).

(Configuration of a Display Device)

A configuration of a display device 400 according to Practical Example 3 in an embodiment of the present invention will be described by using FIG. 13. Additionally, a configuration of the display device 400 according to the present practical example includes the configuration of the light source device (110 or the like) according to Practical Example 1, so that different parts will mainly be described in the following descriptions.

As illustrated in FIG. 13, the display device 400 according to the present practical example is provided with the light source device (110, 120, or 130) according to Practical Example 1. Furthermore, the display device 400 has a light quantity homogenizing part 41 for homogenizing a light quantity of light emitted from a light source device (110 or the like), image forming means 42 for forming an image by using light from a light source device, and a transmission optical system 43 for transmitting outputted light (synthetic light) with a light quantity homogenized by the light quantity homogenizing part 41 to the image forming means 42. Additionally, the display device 400 may further has storage means 44 for storing an operation state, an operation condition, and the like of the display device 400, and I/F means 45 for conducting an input or output of information with an exterior of the display device 400.

The control means 10 are means for instructing each component of the display device 400 to conduct an operation so that the operation of each component is controlled. The control means 10 in the present practical example controls an operation of the light source device (110 or the like) so that a timing of lighting, a light intensity (brightness), a quantity of light, and the like of a plurality of light beams emitted from the light source means 11 (a plurality of light-emitting elements 11a or the like in FIG. 6) are controlled. Furthermore, it may be possible for the control means 10 to control an operation of a light source device (110 or the like), so that it may be possible to control a timing of outputting, a light intensity (brightness), a quantity of light, and the like of outputted light outputted from the light source device (110 or the like). Moreover, it may be possible for the control means 10 to control operations of the image forming means 42, so that it may be possible to control an operation for an image to be projected (for example, a lightness or a size of an image to be projected).

Additionally, the control means 10 may control an operation of the image forming means 42 and the like, by using a program (a control program, an application, or the like) stored preliminarily (for example, in a storage means 44). Furthermore, the control means 10 may control an operation of the image forming means 42, and the like, based on information or the like inputted from the I/F means 45 (an input part or the like).

The light quantity homogenizing part 41 is to homogenize color synthesis, a light quantity, a brightness, a lightness, or the like of a pencil of light rays of synthetic light. Furthermore, the light quantity homogenizing part 41 in the present practical example causes homogenized light to be incident on the transmission optical system 43. It may be possible to use, for example, a light tunnel (a light transmitting member such as a rod mirror, a kaleidoscope, or a light pipe) for the light quantity homogenizing part 41.

The image forming means 42 are means for forming an image to be displayed. The image forming means 42 in the present practical example produces an image to be displayed, based on information stored in the storage means 44 and/or information inputted by the I/F means 45. The image forming means 42 may be a configuration for displaying a full-color image by using, for example, image forming elements arranged in a grid-like pattern (an image panel).

The transmission optical system 43 is to transmit outputted light with a light quantity homogenized by the light quantity homogenizing part 41 to the image forming means 42. The transmission optical system 43 may be, for example, a configuration for radiating outputted light with a homogenized light quantity onto (an image panel of) the image forming means 42 as backlight. It may be possible to use, for example, a relay lens for the transmission optical system 43.

The storage means 44 are means for storing information for the display device 400 (for example, "information for an operation", "information for a state", or "information for processing") or the like. It may be possible to use a publicly known technique (a hard disk, a memory, an ROM, an RAM, or the like) for the storage means 44.

The I/F means 45 are means for conducting an input or output of information (for example, an electric signal) between the display device 400 and an exterior of the display device 400. It may be possible for the I/F means 45 to input information for an image to be projected or the like from an external device (a PC or the like). Furthermore, it may be possible for the I/F means 45 to output information for the display device 400 or the like to an external device (a PC or the like). It may be possible for the I/F means 45 to include an input part for inputting information from an exterior of the display device 400 (for example, a user interface such as an operation panel) by a user. Furthermore, it may be possible for the I/F means 45 to include an output part for outputting (displaying) information to an exterior of the display device 400 (for example, a display part such as a touch panel).

(Operation for Displaying an Image)

An operation of the display device 400 according to Practical Example 3 in an embodiment of the present invention to display an image will be described.

First, the display device 400 synthesizes light emitted from a plurality of light-emitting elements (11a or the like) to produce synthetic light by using a light source device (110 or the like) similarly to the case of Practical Example 1. Then, produced synthetic light (radiation light) is incident on the light quantity homogenizing part 41.

Herein, it may be possible for the display device 400 in the present practical example to synthesize a plurality of light beams from a plurality of light sources by using a light source device (110 or the like), so that it may be possible to produce synthetic light with a smaller cross section of a pencil of light rays. That is, it may be possible for the display device 400 to produce synthetic light at a higher density (higher brightness) by using a light source device (110 or the like).

Thereby, it may be possible for the display device 400 according to the present practical example to reduce an incident angle of synthetic light incident on the light quantity homogenizing part 41. Furthermore, it may be possible for the display device 400 to reduce an incident angle of synthetic light incident on the light quantity homogenizing part 41 so that it may be possible to reduce diffusion of light radiated onto the image forming means 42 (an image panel). Moreover, it may be possible for the display device 400 to reduce diffusion of light radiated onto the image forming means 42 (an image panel) so that it may be possible to improve an image quality or the like of an image to be displayed.

Then, the display device 400 homogenizes color synthesis or the like of synthetic light incident on the light quantity homogenizing part 41 by using the light quantity homogenizing part 41. Subsequently, the display device 400 causes homogenized light to be incident on the image forming means 42 (an image panel) through the transmission optical system 43. Thereby, it may be possible for the display device 400 to display an image onto the image forming means 42 (an image panel) by using radiation light (synthetic light) incident on the image forming means 42.

As described above, it may be possible for the display device 400 according to Practical Example 3 in an embodiment of the present invention to obtain an effect similar to those of the light deflector 100 according to the embodiment described above, the light source device 110 according to Practical Example 1, and the light source device 120 or 130 according to the variation example thereof. That is, it may be possible for the display device 400 according to the present practical example to improve an efficiency of utilization of light, so that it may be possible to attain reduced electric power consumption and it may be possible to realize a more compact, lighter-weight, and higher intensity display device.

Although preferable embodiments and practical examples of the present invention have been described above, the present invention is not limited to the embodiments and practical examples described above. Furthermore, it is possible to alter or modify the present invention variously in light of the accompanying claims.

APPENDIX

An Illustrative Embodiment(s) of a Deflector and Alight Source Device, and, an Image Projecting Device and a Display Device At least one illustrative embodiment of the present invention may relate to a light deflector.

An object of at least one illustrative embodiment of the present invention may be to provide a light deflector capable of producing synthetic light by deflecting each of a plurality of light beams with a substantially elliptical cross-sectional shape in a case where a light-emitting element is used for emitting a light beam with a substantially elliptical cross-sectional shape.

According to at least one aspect of the present invention, there is provided a light deflector having a light-emitting element for emitting a light beam with a substantially elliptical cross-sectional shape and a lens for condensing a light beam emitted from the light-emitting element, wherein the light deflector is characterized in that a optical axis of the light-emitting element and an optical axis of the lens are decentered and a longitudinal axis of the light beam with a substantially elliptical cross-sectional shape is arranged in a direction orthogonal to a direction of decentering on the lens.

Illustrative embodiment (1) is a light deflector having a light-emitting element for emitting a light beam with a substantially elliptical cross-sectional shape and a lens for condensing light emitted from the light-emitting element, wherein the light deflector is characterized in that an optical axis of the light-emitting element and an optical axis of the lens are decentered and a longitudinal axis of the light beam with a substantially elliptical cross-sectional shape is arranged in a direction orthogonal to a direction of decentering on the lens.

Illustrative embodiment (2) is the light deflector as described in illustrative embodiment (1), characterized by further having a holding means for holding the light-emitting element, wherein the holding means arrange and hold a plurality of the light-emitting elements in a substantially circular shape.

Illustrative embodiment (3) is the light deflector as described in illustrative embodiment (2), characterized in that the light-emitting element is provided with a positioning part for determining a position of a longitudinal axis of the light beam with a substantially elliptical cross-sectional shape.

Illustrative embodiment (4) is the light deflector as described in illustrative embodiment (2) or illustrative embodiment (3), characterized by further having supporting means for supporting the lens, wherein the supporting means are provided with a plurality of supporting members having an outline with a substantially cylindrical shape for supporting each of a plurality of the lenses, and wherein the plurality of supporting members support each of the plurality of the lenses at one end of the substantially cylindrical shape and each of a plurality of the light-emitting elements is arranged at another end of the substantially cylindrical shape.

Illustrative embodiment (5) is the light deflector as described in any one of illustrative embodiment (2) to illustrative embodiment (4), characterized in that the plurality of the light-emitting elements are LEDs or LDs.

Illustrative embodiment (6) is a light source device characterized by having the light deflector as described in any one of illustrative embodiment (2) to illustrative embodiment (5) and reflecting means for reflecting light transmitted through a plurality of the lenses, wherein the reflecting means are provided with a first reflection part arranged at a position opposing a plurality of the light-emitting elements and a second reflection part arranged at a central portion of a substantially circular shape of the plurality of the light-emitting elements arranged in the substantially circular shape, wherein the first reflection part reflects a plurality of light beams emitted from the plurality of the light-emitting elements toward a direction of the second reflection part, and wherein the second reflection part reflects each of the plurality of light beams reflected by the first reflection part in a direction of radiation to produce synthetic light.

Illustrative embodiment (7) is the light source device as described in illustrative embodiment (6), characterized in that the first reflection part is a mirror with a ring shape and the second reflection part outputs the plurality of light beams reflected by the first reflection part in a direction of a central portion of the ring shape of the first reflection part.

Illustrative embodiment (8) is the light source device as described in illustrative embodiment (6) or illustrative embodiment (7), characterized by further having temperature adjusting means for sending cooling air to the plurality of the light-emitting elements, wherein the temperature adjusting means send the cooling air with a substantially ring shape corresponding to the plurality of the light-emitting elements arranged in the substantially circular shape.

Illustrative embodiment (9) is an image projecting device characterized by having the light source device as described in any one of illustrative embodiment (6) to illustrative embodiment (8), a projection optical system for projecting an image by using synthesized synthetic light, and image forming means for forming the image to be projected.

Illustrative embodiment (10) is the image projecting device as described in illustrative embodiment (9), characterized in that the projection optical system is provided with a light quantity homogenizing part for homogenizing a light quantity of a pencil of light rays of the synthetic light, a light condensing part for radiating light homogenized by the light quantity homogenizing part onto the image formed by the image forming means, and a projection lens part for projecting light transmitted through the image.

Illustrative embodiment (11) is a display device characterized by having the light source device as described in any one of illustrative embodiment (6) to illustrative embodiment (8), a light quantity homogenizing part for homogenizing a light quantity from the light source device, image forming means for forming an image by using light from the light source device, and a transmission optical system for transmitting outputted light with a light quantity homogenized by the light quantity homogenizing part to the image forming means.

According to at least one illustrative embodiment of the present invention, it may be possible to provide a light deflector capable of producing synthetic light by deflecting each of a plurality of light beams with a substantially elliptical cross-sectional shape in a case where a light-emitting element is used for emitting a light beam with a substantially elliptical cross-sectional shape.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application claims the benefit of priority based on Japanese Patent Application No. 2012-174429 filed on Aug. 6, 2012 and Japanese Patent Application No. 2013-108177 filed on May 22, 2013, the entire content of which is hereby incorporated by reference.

What is claimed is:

1. A light deflector comprising:
a light-emitting element configured to emit a light beam with a substantially elliptical cross-sectional shape; and
a lens configured to directly receive light emitted from the light-emitting element to condense the light,
wherein an optical axis of the light-emitting element and an optical axis of the lens are parallel and non-overlapping and a longitudinal axis of the light beam with the substantially elliptical cross-sectional shape is arranged in a direction orthogonal to a direction in which the optical axis of the lens is decentered with respect to the optical axis of the light-emitting element.

2. The light deflector as claimed in claim 1, further comprising:
a holder configured to hold the light-emitting element,
wherein the holder arranges and holds a plurality of the light-emitting elements in a substantially circular shape.

3. The light deflector as claimed in claim 2, wherein the light-emitting element includes a positioning part configured to determine a position of the longitudinal axis of the light beam with the substantially elliptical cross-sectional shape.

4. The light deflector as claimed in claim 2, further comprising:
a supporter configured to support the lens,
wherein the supporter includes a plurality of supporting members having an outline with a substantially cylindrical shape and supporting each of a plurality of the lenses, and
wherein the plurality of the supporting members support each of the plurality of the lenses at one end of the substantially cylindrical shape and each of the plurality of the light-emitting elements is arranged at another end of the substantially cylindrical shape.

5. The light deflector as claimed in claim 2, wherein the plurality of the light-emitting elements are LEDs or LDs.

6. A light source device comprising:
a light-emitting element configured to emit a light beam with a substantially elliptical cross-sectional shape;
a lens configured to condense light emitted from the light-emitting element, wherein an optical axis of the light-emitting element and an optical axis of the lens are parallel and non-overlapping and a longitudinal axis of the light beam with the substantially elliptical cross-sectional shape is arranged in a direction orthogonal to a direction in which the optical axis of the lens is decentered with respect to the optical axis of the light-emitting element;
a holder configured to hold the light-emitting element, wherein the holder arranges and holds a plurality of the light-emitting elements in a substantially circular shape; and
a reflector configured to reflect light transmitted through a plurality of the lenses,
wherein the reflector includes a first reflection part arranged at a position opposing the plurality of the light-emitting elements and a second reflection part arranged at a central portion of a substantially circular shape of the plurality of the light-emitting elements arranged in the substantially circular shape,
wherein the first reflection part reflects a plurality of light beams emitted from the plurality of the light-emitting elements toward a direction of the second reflection part, and
wherein the second reflection part reflects each of the plurality of light beams reflected by the first reflection part in a direction of radiation to produce synthetic light.

7. The light source device as claimed in claim 6, wherein the first reflection part is a mirror with a ring shape and the second reflection part outputs the plurality of light beams reflected by the first reflection part in a direction of a central portion of the ring shape of the first reflection part.

8. The light source device as claimed in claim 6, further comprising a temperature adjuster configured to send cooling air to the plurality of the light-emitting elements, wherein the temperature adjuster sends the cooling air with a substantially ring shape corresponding to the plurality of the light-emitting elements arranged in the substantially circular shape.

9. An image projecting device comprising:
the light source device as claimed in claim 6;
a projection optical system configured to project an image by using the synthetic light produced by the light source device; and
an image former configured to form the image to be projected.

10. The image projecting device as claimed in claim 9, wherein the projection optical system includes a light quantity homogenizing part configured to homogenize a light quantity of a pencil of light rays of the synthetic light, a light condensing part configured to radiate light homogenized by the light quantity homogenizing part onto the image formed by the image former, and a projection lens part configured to project light transmitted through the image.

11. A display device comprising:
the light source device as claimed in claim 6;
a light quantity homogenizing part configured to homogenize a light quantity from the light source device;
an image former configured to form an image by using light from the light source device; and
a transmission optical system configured to transmit outputted light with a light quantity homogenized by the light quantity homogenizing part to the image former.

* * * * *